US009549254B2

(12) United States Patent
Nyshadham et al.

(10) Patent No.: US 9,549,254 B2
(45) Date of Patent: Jan. 17, 2017

(54) METHOD AND SYSTEM OF ACOUSTIC SIGNAL MIXING

(71) Applicant: Intel Corporation, Santa Clara, CA (US)

(72) Inventors: Phani Kumar Nyshadham, Bangalore (IN); Niranjan Avadhanam, Bangalore (IN); Shivakumar D R, Bangalore (IN)

(73) Assignee: Intel Corporation, Santa Clara, CA (US)

(*) Notice: Subject to any disclaimer, the term of this patent is extended or adjusted under 35 U.S.C. 154(b) by 56 days.

(21) Appl. No.: 14/564,849

(22) Filed: Dec. 9, 2014

(65) Prior Publication Data

US 2016/0165347 A1 Jun. 9, 2016

(51) Int. Cl.

| | |
|---|---|
| ***H04B 1/00*** | (2006.01) |
| ***H04R 3/00*** | (2006.01) |
| ***G10L 19/008*** | (2013.01) |
| ***G10L 21/0208*** | (2013.01) |
| *G10L 21/0216* | (2013.01) |

(52) U.S. Cl.

CPC ............. *H04R 3/005* (2013.01); *G10L 19/008* (2013.01); *G10L 21/0208* (2013.01); *G10L 2021/02166* (2013.01); *H04R 2499/11* (2013.01)

(58) Field of Classification Search

CPC .................... G10L 19/008; G10L 2021/02166; G10L 21/0208; H04R 3/005; H04R 2499/11; H04R 1/32; H04R 1/326; H04R 2203/00; H04R 2401/00

See application file for complete search history.

(56) References Cited

U.S. PATENT DOCUMENTS

| | | | | |
|---|---|---|---|---|
| 4,558,180 | A | 12/1985 | Scordo | |
| 2013/0272539 | A1 | 10/2013 | Kim et al. | |
| 2015/0199976 | A1* | 7/2015 | Yadav ................. | G10L 21/0202 704/201 |

OTHER PUBLICATIONS

Van Veen et al., "Beamforming: A Versatile Approach to Spatial Filtering," IEEE ASSP Magazine, Apr. 1988, pp. 4-24.

* cited by examiner

*Primary Examiner* — Andrew L Sniezek
(74) *Attorney, Agent, or Firm* — Green, Howard, & Mughal, LLP

(57) ABSTRACT

A system, article, and method of acoustic signal mixing comprises use of a total pair that is a count of the number of addition coefficients and subtraction coefficients in a mixture configuration and used with a function applied to a frame of acoustic samples to determine an outcome.

25 Claims, 9 Drawing Sheets

METHOD AND SYSTEM OF ACOUSTIC SIGNAL MIXING

BACKGROUND

Many mobile devices, such as cellular phones or smartphones, have multiple microphones to receive sound waves from speech for example, and to generate audio. Multiple microphones may be used in order to provide spatial audio affects and/or for better quality noise blocking on mobile phones for example. Each microphone is considered its own channel forming its own signal which is combined with other signals to form a single mixed output signal to listen to the sounds on the same device or another audio device receiving the output signal. It is also possible to generate multiple mixed output signals as intermediate signals for purposes of speech or audio enhancement and processing. These systems may provide a number of available alternative output signal combinations to provide different effects or different levels of quality of the signal. The multichannel systems are often processed by using a switch matrix which have high computational costs, especially when performing multiplication. Conventional solutions use tree-based approaches to limit the multiplication operations, but the tree becomes more complex and computationally costly with each branch added. Thus, these tree-based systems are often limited to just a small subset of all possible signal combinations that could be available. Therefore, a signal mixing method and system that provides many different signal combinations with a low computational cost is desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
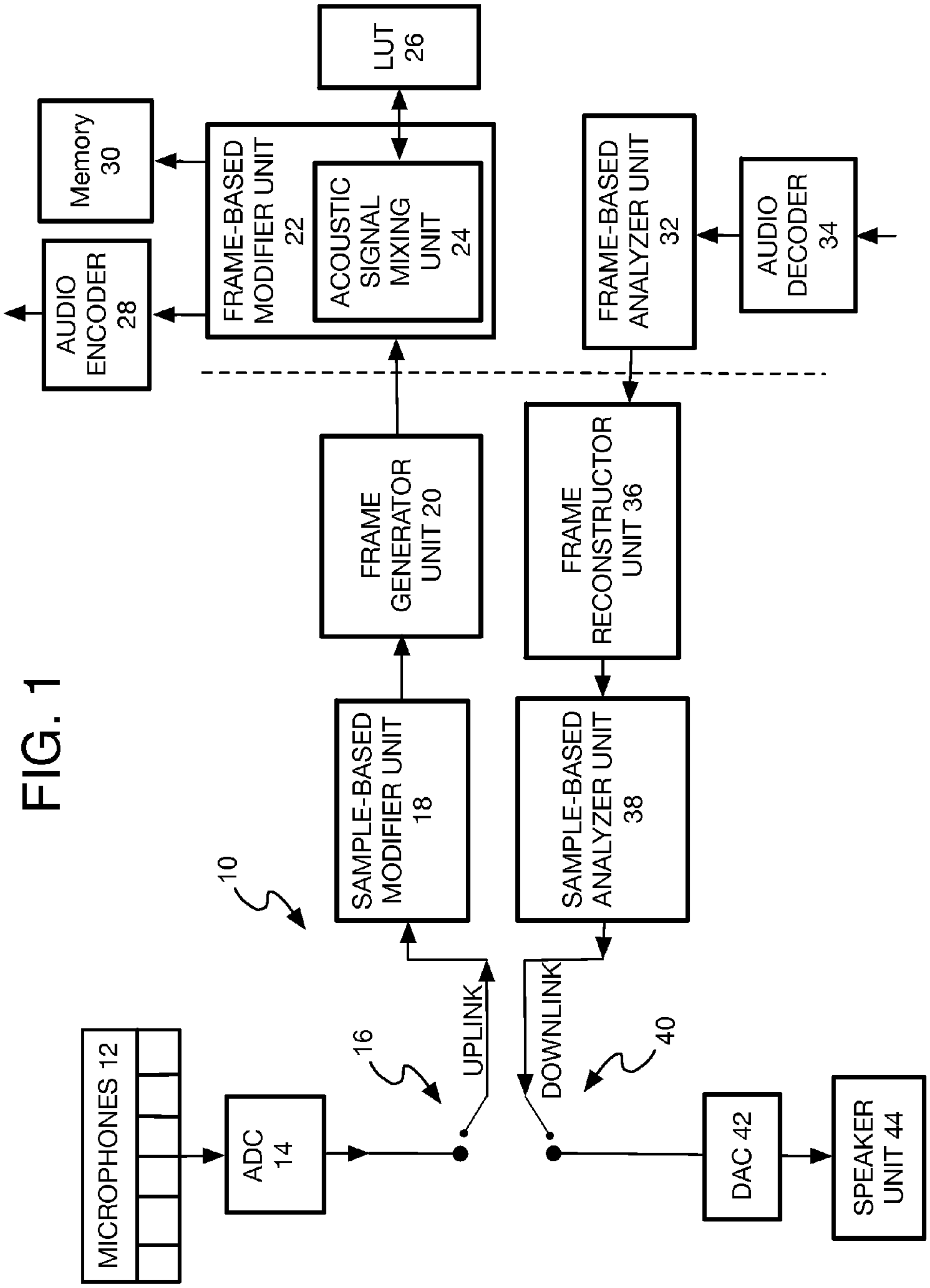
FIG. 1 is a schematic diagram showing an audio processing system with an acoustic signal mixing unit.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones, video game panels or consoles, high definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of acoustic signal mixing.

As mentioned above, many mobile phones have multiple microphones to receive sound waves such as from human speech, and to provide different acoustic effects and/or for noise cancellation. Thus, it is important to efficiently mix acoustic signal vectors (also referred to as frames) from multiple sources. In many applications, the mixing of multiple acoustic signals on a frame-by-frame basis is accomplished through Switch Matrix (SWM)-based processing, beamforming (which emphasizes a beam of sound waves from a certain direction), spatial audio adjustments, and so forth, on mobile devices.

The mixing of acoustic signals from multiple sources is conventionally performed on a frame basis (vector basis) by applying the desired set of mixing coefficients on the corresponding input signal frames to produce desired mixed output signal frames. The number of samples over a period of time depends on the operating sampling rate of the acoustic system. For example, at 8 KHz sampling rate (narrow band speech), 160 samples are obtained by sampling the speech signal for a period of 20 msec. When multiple sources are used, multiple frames may be placed together in a signal-matrix so that the frames form the columns of the signal-matrix, and each row is one of the samples with a signal sample value from each source in the matrix. Then, the transpose variant of the signal-matrix may be formed and used for the signal mixing if desired.

Often, a signal mixing problem is viewed as a matrix multiplication calculation, and particularly, as multiplication of the signal-matrix and mixture-matrix (although the mixture-matrix may only have one column vector). A column in the mixture-matrix is a single mixture configuration used to obtain an output signal frame sample-wise. That refers to, for each sample of input signals, an output mixed sample is generated, and this process continues until all the samples for the desired output frame are obtained. To generate multiple output signal frames, the signal-matrix may be multiplied with a mixture-matrix that has multiple mixing configurations (or in other words, multiple columns). Each mixture configuration has a set of mixture coefficients to be applied to the input frames sample-wise to form an output signal frame. Typically, producing multiple output signals is needed because each output signal is for a specific purpose like noise reduction, feature extraction, desired frequency/time domain effect, etc. It might also happen that the multiple output signals act as intermediate signals for the purpose of speech/audio enhancement and processing.

In many scenarios, the coefficients of the mixture configuration are drawn from the set $\{-1, 0, +1\}$. In scenarios when the coefficients belong only to $\{+1, 0\}$ or $\{-1, 0\}$, the mixing becomes relatively trivial, especially in the case of only one non-zero coefficient in the set of possible coefficients. In this case, there is only one operation, adding the right signal to the zero signal or subtracting the right signal from the zero signal, and this operation has relatively lower cost. The problem of mixing is much more complex when the coefficients belong to the set of $\{-1, 0, +1\}$ where both positive and negative non-zero coefficients are in the set, which is typically solved through switch matrix-based processing.

In more detail, for the signal-matrix, the number of sources of acoustic signals (or number of frames or vectors) is set as Y (the columns of the signal-matrix), and each frame has X samples (the rows of the signal-matrix each with a sample value from a different source) so that the signal-matrix defined is of size X×Y. The mixture-matrix is of size Y×Z (where Y now forms the rows) to generate an X×Z output signal-matrix, where each column of Z refers to an output signal or output frame of size X×1. This problem of multiplication of two matrices results in $X*Y*Z$ multiplications and $Z*X*(Y-1)$ additions for obtaining the output signal-matrix of X×Z.

As mentioned before, since the mixture coefficients belong to the set $\{-1, 0, +1\}$, the multiplications between the mixture coefficients and the signal values from the signal-matrix can be treated as "trivial" because each output X×1 signal is actually obtained by additions, subtractions, and zeroing of some signals. In other words, if the samples from 3 sources belonging to a particular row are 5, 2, 4 respectively, and a corresponding mixture configuration in the mixture-matrix is −1, 0, +1; then a typical matrix multiplication calculation would be $(5)(-1)+(2)(0)+(4)(1)$ to obtain an output signal value for the particular column of the output signal-matrix for that particular row position. These multiplication operations repeated over 160 samples are computationally heavy for obtaining the whole frame. Thus, instead, the operations in this case include making the 5 negative (−5), eliminating (or zeroing) the 2 signal by replacing it with 0, and simply keeping the 4 as a positive value, all without actually performing multiplication operations. These three values are then summed to obtain the output value.

The matrices can become so large however, even using the trivial multiplications can become very expensive in terms of time and power consumption. Thus, in order to avoid the trivial multiplications, some of the earlier solutions try to solve this problem with a tree-based approach, where at each node, a decision is made to either add or subtract or zero out the particular signal component. A decision making branch is executed for each coefficient (inside a mixture configuration) to take a different path based on −1 or 0 or +1. Hence, a 3-way decision making logic is implemented for each mixing node (each coefficient for a mixture configuration). This decision making logic is traversed on a frame-by-frame basis, each time producing a frame of an output signal. This tree-based approach is repeated for each and every column of the mixture-matrix. This way, the trivial multiplications are avoided at the expense of branching logic whose complexity is proportional to the number of sources of acoustic signals. Thus, the computational cost multiplies as more output signals, and in turn proportionally more columns in the mixture-matrix, is desired.

Also, since the tree-based approach is performed at the vector or frame level, the arithmetic operations will be interleaved with the decision-making such that parallel processing, such as single-instruction multiple data (SIMD), becomes extremely difficult to implement. This also means that the decision making itself adds high computational costs since it is performed during the matrix multiplication and repeated for each and every frame and for every output signal. Finally, in some cases, in order to reduce the complexity of branching logic in tree-based approaches, the freedom to mix any combination of the acoustic signals is restricted. For example, a rule may be used for six sources that signals S1-S3 cannot be added when using signals S4-S6, and so forth. This limits the permissible combinations, as presented by mixture-configurations in the mixture-matrix, to a small subset of all possible combinations for an application.

To resolve these issues, the presently disclosed method and system significantly reduces the computational cost of performing the matrix multiplication between the signal-matrix and the mixture-matrix (or a mixture vector) to obtain output signals, and does so by using a low complexity solution that still performs acoustic signal mixing on a frame-by-frame (or vector-by-vector) basis, and for applications such as Beamforming, switch-matrix realization, spatial audio effects, and so forth. This is accomplished by providing an acoustic signal mixing algorithm that provides a function to generate an output signal frame by using a count of the number of input signal frames to be added and the number of input signal frames to be subtracted based on a mixture configuration, and provides such a function for each possible mixture configuration that can be placed into a mixture-matrix. A function is uniquely mapped to a solution pair (total pair) inside a Look Up Table (LUT).

Specifically, a solution or total pair is formed (x, y) such that x is the total number of 1s in the mixture configuration, and y is the total number of −1s in the mixture configuration. The total pair is provided for each possible mixture configuration, and disregards the position of the coefficients within the mixture configuration. The number of total pairs available depends on the number of sources available. Thus, for six sources, there are 28 possible pairs where each pair is accounted for once in a list or look up table of the pairs. This eliminates the need to provide 729 possible different functions for six sources that considers the position of the coefficients within the mixture configuration. Since each pair applies to many variations of coefficient orders except with the same number of +1 or −1 coefficients, listing each possible total pair associated with a single mixing function significantly reduces the size of the table needed to list all functions for multiplying the matrices.

The function indicates how to mix (sum/subtract) the signal frames (sample-wise) and according to a mixture configuration. The mixing function has a rearrangement of the signal frames (sample-wise), so that the signal frames (sample-wise) to be added are all grouped first, and the signal frames (sample-wise) to be subtracted are grouped next (as one of many possible rearrangements). Thus, for example for a total pair (3, 2), the function indicates that the signal frames (sample-wise) are to be rearranged to match the (3, 2) configuration so that the three frames (sample-wise) to be added are listed first, and the two frames (sample-wise) to be subtracted are listed next. This list of reordered signals is fed to the right mixing function which performs the arithmetic in a specific way. The reordering assists to provide a minimal sized LUT for a specific number of sources as explained in the previous paragraph. Then, once the correct mixing function is applied, 3 additions will be performed first and 2 subtractions thereafter. The operations are performed in this order, also for enabling minimal sized LUT. The reordering of frames (sample-wise) and ordering of arithmetic operations, provides an arrangement to maintain minimal sized LUT which can be expanded for growing number of sources of input signals. There can be many variations to this reordering of input signals which includes reordering of arithmetic inside the mixing functions. As an example, grouping first the input signals which are to be subtracted and then grouping the input signals to be added might also be a scheme in which the mixing function first subtracts the specific number of signals followed by addition of specific number of signals. Alternating the input signals which are to be added and subtracted might be one more scheme of reordering which again implies that the mixing function will perform alternating addition and subtraction of specific number of signals. Many such reordering schemes are possible.

A reordering scheme applies to both reorderings—reordering of arithmetic inside the mixing functions as well as reordering of inputs for the mixing functions. For example, there is a generic mixing function which adds 3 signals and then subtracts 2 signals mapped to a total pair (3, 2). An alternative reordering scheme for the arithmetic of this generic mixing function can be—Add first 2 signals, then subtract $3^{rd}$ signal, then add $4^{th}$ signal and then finally subtract $5^{th}$ signal. Based on this reordering scheme, the inputs passed to this function are also to be reordered as "First 2 signals should correspond to any 2 of positive elements of mixing column, the $3^{rd}$ signal should correspond to any one of the negative elements of mixing column, the $4^{th}$ signal should correspond to the signal corresponding to the remaining positive element in the mixing column, the $5^{th}$ signal should correspond to the remaining negative element of the mixing column. Following the notation that we have signals {S1, S2, S3, S4, S5, S6} and the mixing configuration is $\{-1, 1, 0, 1, 1, -1\}^T$. The total pair is (3, 2). For this example reordering scheme, the reordering of inputs can be {S2, S4, S1, S5, S6} or {S4, S2, S6, S5, S1} or {S5, S4, S6, S2, S1}, and so forth.

Each mixture configuration will be associated with an offset index value (OIV) so that once it is determined which solution or total pair applies to a mixture-configuration, the offset index value inside the LUT (OIV) is computed to indicate which function is to be applied for that mixture configuration. Essentially, the OIV gives the location of a solution or total pair inside the LUT, which in turn gives the location of the desired function inside the LUT. The pairs may be ordered within the list or look up table first in the sense that "which pair is at which location" inside the LUT is based on a formula or some kind of mapping (in the form of a table) which is applied on the total pair under consideration. This "well ordering" provides a very easy arrangement that can be expanded or reduced as the number of available sources is changed. The OIV is calculated based on the numbers in each total pair, and the total number of non-zero coefficients in the total pair. The OIV number coincides with the ordering of the functions in the look up table.

With this algorithm, trivial multiplications are minimized or completely avoided while mixing acoustic signals from multiple sources, and without the use of complex branching logic. At the same time, the algorithm consumes a relatively small memory space without the need to limit the content or number of mixture configurations and coefficient combinations. The approaches described herein efficiently handles large numbers of mixing combinations, and are versatile so that the number of combinations (or mixture configurations) may grow at O ($N^2$) with the number of sources without complicated changes to the algorithm. Even if the number of sources is reduced, the offset index value for a total pair and the number of total pairs in the LUT remains the same.

Referring now to FIG. 1, an audio processing system 10 may have an audio capture or receiving device 12, such as a network of acoustic signal sources such as microphones for example, to receive sound waves, and that converts the waves into raw electrical acoustical signals that may be recorded in a memory or processed further. The sources 12 may transmit a number of acoustic signals recording the same sound at the same time. The system 10 may be, or may be considered to be part of, a pre-processing unit of an audio system that provides output signals to be encoded for transmission, recording, or for immediate generation of an audio signal broadcast. The acoustic signals may be generated from sound waves of human speech (such as acoustic signals of about 8 khz for narrowband speech to about 16 khz for wide-band speech), and therefore may be provided for speech or voice recognition in addition to telephonic communication, or the acoustic signals may be formed from other sounds such as music, other industrial sounds, and is not particularly limited.

The system 10 may have an analog/digital (ADC) converter 14 to provide a digital acoustic signal. An uplink switch 16 may be provided to obtain samples of the acoustic signal from the ADC 14 at a defined sampling rate (8 KHz for narrowband, 16 KHz for wide-band, 48 KHz for audio), for example, and may be triggered by analog front-end (AFE) interrupts. The signal samples then may be provided to a sample-based signal modifier 18 that is used to perform work individualized for each sample, and this may include, for example; filtering to smooth the signal sample or to apply gains, etc.

The modified signal samples then may be placed in a buffer which is accessed by a frame generator 20 to place a number of samples from the buffer into a frame for subsequent frame-by-frame analysis and signal mixing. By one example, 160 or 320 samples for a duration of 20 msec at 8 KHz and 16 KHz sampling rates respectively may be placed in each frame, although it may be any other desired number of samples. Frame-based processing may be triggered by a frame-interrupt which occurs after n AFE interrupts, where n equals the number of samples to be placed into a frame. A frame-based signal modifier 22 may obtain the frames of acoustic signal samples for frame-based processing and to use an acoustic signal mixing unit 24 to mix the signal frames from different sources. The frame-based signal modifier 22 also may have several modules including Acoustic Echo Cancellation, noise reduction, etc., which perform frame based speech/audio enhancement and processing.

As to the signal mixing, the acoustic signal mixing unit 24 may perform a matrix multiplication algorithm by multiplying a signal-matrix with a single vector mixture configuration when one output signal is desired, or with a mixture-matrix of mixture configurations when multiple output signals are desired. As mentioned herein, producing multiple output signals may be available, each output signal for a specific purpose like noise realization, feature extraction, spatial effect, desired frequency/time domain effect, etc. It might also happen that the multiple output signals act as intermediate signals for the purpose of speech/audio enhancement and processing. The acoustic signal mixing unit 24 may use a look up table 26 in a memory to generate the output signals by using an offset index value associated with total pairs which in turn maps to a correct mixing function organized on the look up table and as explained in detail below. The output signals then may be provided to other applications such as an audio encoder 28 to compress the acoustic signals for placement into a bitstream for transmission to other devices, placed in a memory 30, or provided for audio playback through loud speaker unit 44.

Alternatively, a decoder 34 may receive a bitstream with compressed output signals. The decoder 34 may decompress the output signals and reconstruct the frames of the output signals. The frame-based signal analyzer 32 performs several speech/audio enhancement tasks like downlink noise reduction, ambient noise adaptation, etc. The frame-based signal analyzer 32 then provides the modified frames to a frame reconstruction unit 36 that rebuilds the samples for each of the frames A sample-based signal analyzer 38 further processes each sample in a frame by filtering followed by proper gain application and other sample-based processing, and feeds the samples to the DAC unit 42 as triggered by a downlink switch 40 upon analog front-end interrupts. Once converted to analog, the signals are provided to the speaker unit 44. It will be understood that speaker unit 44 may be any device that can emit sound for the signals being processed.

Figure 2:
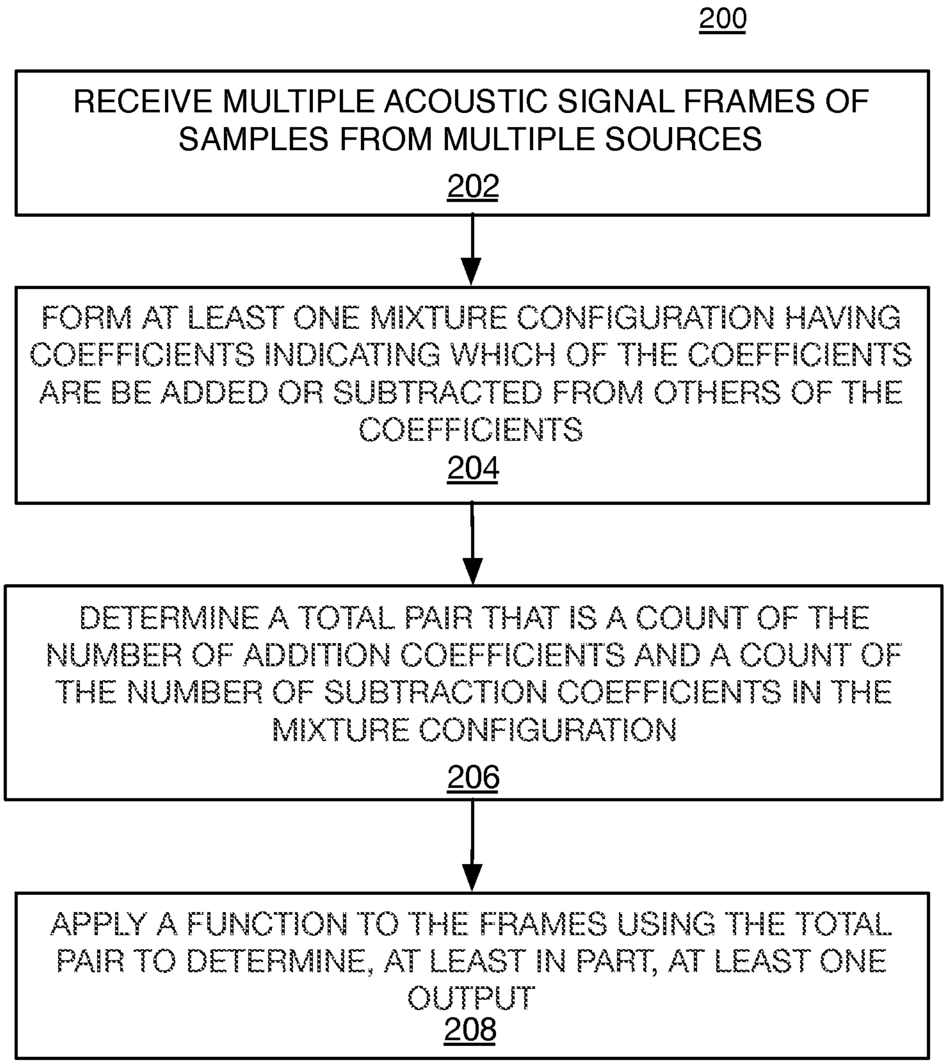
FIG. 2 is a flow chart of an acoustic signal mixing method.

Referring to FIG. 2, an example process 200 for a computer-implemented method of acoustic signal mixing is provided. In the illustrated implementation, process 200 may include one or more operations, functions or actions as illustrated by one or more of operations 202 to 208 numbered evenly. By way of non-limiting example, process 200 may be described herein with reference to example acoustic signal processing devices described herein with any of FIGS. 1, 4, 6, 8-9, and where relevant.

Process 200 may include "receive multiple acoustic signal frames of samples from multiple sources" 202. In other words, this operation is directed to the performance of obtaining acoustic signals from a network of sources, which may be provided on a single electronic device such as a mobile phone by one non-limiting example.

Process 200 also may include "form at least one mixture configuration having coefficients indicating which one of the coefficients is to be added or subtracted from others of the coefficients" 204. As described in detail herein, the coefficients forming mixture configurations for the mixture-matrix may be selected from the set of {1, 0, −1}, and the coefficients may be arranged to correspond to signal frames from specific sources.

Process 200 also may include "determine a total pair that is a count of the number of addition coefficients and a count of the number of subtraction coefficients in the mixture configuration" 206. As explained in detail herein, a total pair (x, y) has 'x' as the total number of the positive (1) coefficients in the mixture configuration, and 'y' as the total number of negative (−1) coefficients in the mixture configuration.

Process 200 also may comprise "apply a function to the frames using the total pair to determine, at least in part, at least one output" 208, and particularly, the function may mix the specified number of input signal frames (sample-wise) in a specific manner. Then the signal frames (sample-wise) may be reordered, and by one example, so that the signal frames (sample-wise) corresponding to the positive mixing coefficients are grouped together first, and then the signal frames (sample-wise) corresponding to the negative mixing coefficients are grouped together next, both grouped in numbers according to the total pair. Then by another option, the signal frames (sample-wise) corresponding to the positive coefficients are added first, and the signal frames (sample-wise) corresponding to the negative mixing coefficients are subtracted thereafter to obtain the effective output signal frame (sample-wise).

Also, by the example approach, the two numbers in each total pair are used to calculate an offset index value to list an associated function in a table for example. Thus, once the total pair for a mixture configuration is known, the signal mixing system may simply look up the corresponding offset value to determine which function to apply to the reordered signal frames (sample-wise). By one example form, there may be many signal frames, and any number of mixture configurations. Thus, this calculation may be equivalent to multiplying the signal-matrix by a mixture-matrix of a plurality of different mixture configurations to generate an output matrix of a plurality of output frames, where each output signal frame represents a single mixture configuration applied to input signal frames.

As mentioned above, the algorithm disclosed herein provides mixing of acoustic signals in the form of frames, where each frame has multiple sample signal values from a source over time, and that can produce a desired number of multiple output signals. Such a system may be based on an efficient Look Up Table (LUT) approach disclosed herein. The LUT may contain a list of all possible mixing functions. Based on each mixing configuration (each column of the mixing matrix corresponding to a desired output), an offset of the LUT is computed which uniquely maps to the desired mixing function. This mixing function can be iterated for each and every sample of signal frames from various sources to produce the desired output signal by using the LUT. Thus, one of the first operations for the disclosed acoustic signal mixing process is to establish the look up table. It will be appreciated that throughout the description, a frame of a signal may be referred to as a "signal" because the proposed algorithm may solve the problem of mixing signals on a frame-by-frame basis.

Figure 3:
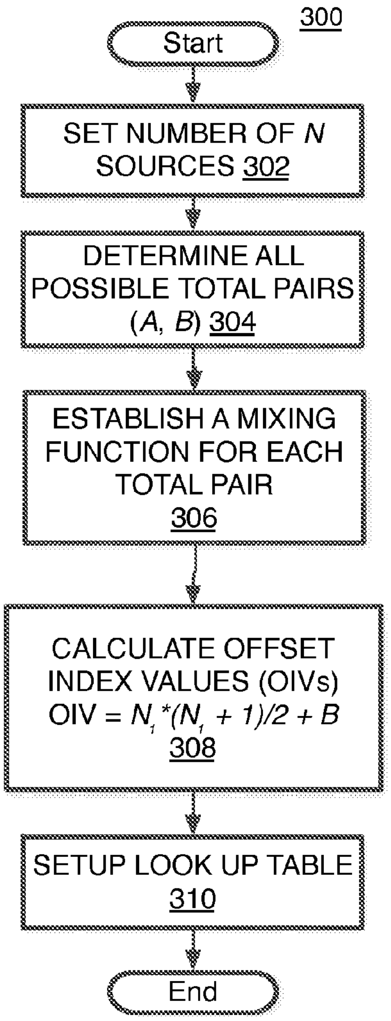
FIG. 3 is a detailed flow chart of an acoustic signal mixing method.
Figure 4:
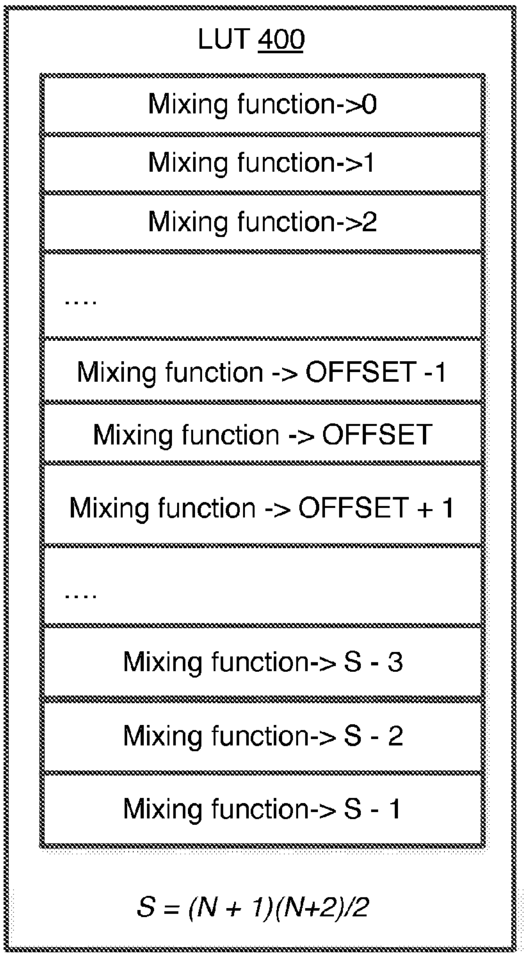
FIG. 4 is a diagram of a look up table (LUT) for the acoustic signal mixing methods herein.

Referring to FIG. 3, an example computer-implemented process 300 for establishing a look up table to be used for efficient acoustic signal mixing is provided. In the illustrated implementation, process 300 may include one or more operations, functions or actions as illustrated by one or more of operations 302 to 310 numbered evenly. By way of non-limiting example, process 300 may be described herein with reference to example acoustic signal mixing devices described herein with any of FIGS. 1, 4, 6, and 8, and where relevant.

The LUT is arranged to easily add mixing functions to the LUT as more acoustic signal sources are added for mixing of the signals. As the number of sources of signals increases, however, the number of mixing combinations increases exponentially. To maintain a LUT with such a large number of mixing combinations is very complex, and requires extremely large areas of memory space. To solve this problem, the disclosed LUT uses simple functions and a low amount of memory space as follows.

Process 300 may include "set number of N sources" 302. As mentioned, an audio device, such as a mobile phone, smartphone, tablet, and so forth may have multiple audio capture devices such as multiple microphones that form acoustic signals, such as speech signals by one example. The multiple microphones may be used for spatial effects, noise cancelling, and so forth. Thus, N may be set as the number of sources of acoustic signals to be mixed or analyzed, and will typically be the number of sources on an electronic device, but may be less than all sources on the device. Where each matrix configuration for the mixture-matrix has coefficients from the set $\{1, 0, -1\}$ for determining which signal from which source is to be added, subtracted, or zeroed, the number of mixing combinations (all possible column combinations of the mixture-matrix) is given by $3^N$. As N increases, $3^N$ increases exponentially. For N=6, there are $3^N$=729 possible different mixture configurations that considers both the sign and position of the coefficients within the mixture configuration.

Process 300 then may include "determine all possible total pairs (A, B)" 304. Specifically, for a given mixture configuration (which is the column of a mixture-matrix), let A be the number of additions (number of 1's) in the mixture configuration, and B be the number of subtractions (number of −1's) in the mixture configuration that can occur for a total pair (also referred to as a solution pair) (A, B). The 0 coefficients are not counted. A and B relative to N then is as follows:

$$A+B\leq N;\text{ where } 0\leq A\leq N,\text{ and where } 0\leq B\leq N \tag{1}$$

The total pairs (A, B) which satisfy the above inequality define all possible number (or count) of arithmetic operations (additions and subtractions), irrespective of order of the coefficients in the mixture configuration, that can be performed on the signals from various sources. For example, given the mixing configuration for N=6 (six sources S1 to S6 to be mixed) as $\{-1, 1, 0, 1, 1, -1\}^T$ or $\{-1, 1, 1, 1, -1, 0\}^T$, the total pair is (3, 2) in both cases.

For example, where N=6, and while complying with equation (1) above, there are 28 possible total pairs. The number of total pairs provides the number of functions to be placed within the LUT. Thus, only 28 possible mixtures of additions and subtractions (irrespective of order) can take place while trying to mix signals from six sources. This drastically reduces the size of the LUT from 729 to 28 mixing functions. With increasing N, the growth of all possible mixing combinations is given by $O(3^N)$. On the other hand, the LUT grows at a rate of $O(N^2)$. The table below compares the actual number of mixing combinations against the mixing functions enumerated inside the LUT, for a given number of sources of acoustic signals. The LUT size is far smaller than the number of actual combinations, thus saving a very significant amount of memory while substantially reducing the complexity of the operations.

| Number of mixing signals (frames/vectors) (N) | Possible mixing combinations | Possible mixing functions inside LUT |
|---|---|---|
| 2 | 9 | 6 |
| 3 | 27 | 10 |
| 6 | 729 | 28 |
| 8 | 6561 | 45 |

Figure 6:
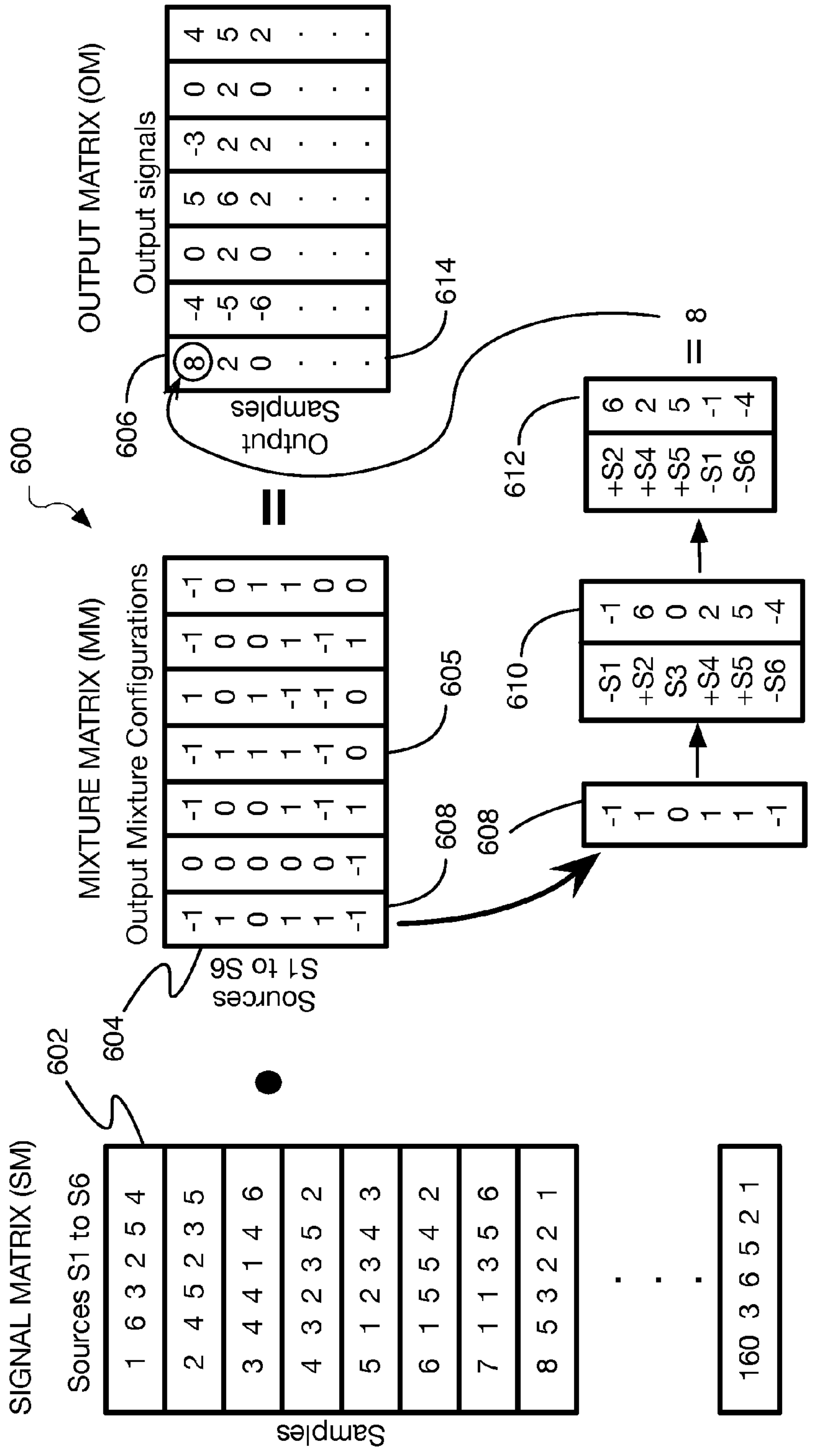
FIG. 6 is a schematic diagram to explain an acoustic signal-matrix computation for the methods of mixing audio signals disclosed herein.

Referring to FIG. 6, in order to assist with the explanation of the disclosed methods herein, a sample matrix multiplication algorithm 600 is shown for multiplying a signal-matrix (SM) 602 by a mixture-matrix (MM) 604 to generate an output matrix (OM) 606. The signal-matrix has frames (or vectors) in the form of columns, one frame (column) for each of the sources, and here continuing the example of six sources labeled S1 to S6 from left to right in the signal-matrix. Each frame has an array or vector of signal samples obtained from an acoustic or speech signal over time. In the present example, there are 160 samples (or 160 sample values for each frame).

The mixture-matrix 604 now has columns, where each column represents a mixture configuration of coefficients for desired output signal frame. The output matrix (OM) has output frames forming the columns of the output matrix, one column for each mixture configuration. Thus, for a column of output signal matrix (OM), each output sample at a particular row number is obtained by taking dot product of the particular row of the input matrix with the desired mixing column (mixing configuration). As mentioned above, the execution of the trivial multiplication is avoided by simply changing the sign of the frame (which is multiplied with −1) and replacing the zeroed frame with frame with 0s. The frames are now summed up sample-wise to get the desired output frame. The mixing function in the LUT is used to apply the mixture configuration to the signal sample values to form an output signal sample (the same operations are repeated for each sample of the input frames, thus yielding an output frame at the end), are formed as follows.

Returning to process 300, the next operation may be "establish a mixing function for each total pair" 306. This operation includes forming an equation to reorder the signal values to simplify the addition and subtraction operations. Each column or configuration matrix of the mixture-matrix 604 forms a total pair, and as explained below, an offset index value (OIV). The first mixture configuration 608 in the mixture-matrix 604 has the total pair (3, 2) from three additions and two subtractions. In order to reorder the sample values (as applied to the coefficients) as shown in applied set 612, the algorithm takes advantage of the fact that additions and subtractions on real numbers are associative, and reorders the samples. The associative property refers to, for example, if 4 real operands are considered:

$$x-z+y-w=x+y-z-w,\text{ where }(x,y,z,w)\text{ belongs to }R^4 \quad (2)$$

This associative property can be extended to a finite number of real operands. Also, for a given mixing function of LUT, a rule is formed as follows: for a given mix of additions and subtractions on a set of operands, first perform all the additions and then perform all the subtractions. This way, each mixing function inside LUT has ordered mixing operations. With ordered mixing operations, unique functions performing a unique mix of additions and subtractions are achieved.

The ordering of the signals (sample-wise) in the function first lists the signals (sample-wise) values to be added, then the signals (sample-wise) to be subtracted in a numerical order as provided in the sample rows of the signal-matrix (from left to right, and from S1 to S6 or from top to bottom as seen as a vertical vector or set 612). Thus, a search may be performed (from top to bottom by one example) of the coefficients in a mixing configuration (mixing column) to identify the positions of positive elements as well as negative elements. The input signals (sample-wise) in every row of the input signal-matrix are arranged such that the samples corresponding to the location of positive coefficients (top to bottom of mixing column) occur first, and then samples corresponding to the location of negative coefficients (top to bottom of mixing column) occur next. Other variations of input reordering is also possible referring to arranging the input signals (sample-wise) in every row of the input signal-matrix such that the samples corresponding to the location of positive coefficients (may be from bottom to top of mixing column, as an alternative) occur first and then samples corresponding to the location of negative coefficients (may be from bottom to top of a mixing column (mixture configuration), as an alternative) occur next. More variations of searching for positive and negative elements of mixing column are possible. The order that the positive elements are listed and negative elements are listed can be any order such that there can be many possible ways of listing the positive elements and negative elements for a mixing configuration.

Thus, for example, continuing with N=6, referring to a mix of signals from sources $\{S1, S2, S3, S4, S5, S6\}^T$, and given the mixing configuration as $\{-1, 1, 0, 1, 1, -1\}^T$, the positions of 1's are found as {2, 4, 5} and the positions of −1's as {1, 6}. Hence the reordering of the mixing input signal sample values is as $\{S2, S4, S5, S1, S6, NULL\}^T$. Another alternative way of reordering is $\{S4, S2, S5, S6, S1, NULL\}^T$ and many more ways can be used.

The mixing function for each total pair, and to be mapped to a total pair and offset index value in the LUT, is generic in the sense that it performs a mix of additions and subtractions (as an example, additions first and subtractions next) on a specific number of generic signals assigned by the total pair. Thus, for example, for a total pair (3, 2), the function may be:

$$+SA+SB+SC-SD-SE \quad (3)$$

where SA to SE are assigned as any of S1 to S6 for total pair (3, 2) according to the reordering of the input signals as per the mixture configuration. In the example above, and from FIG. 6, the example reorder resulting from the mixture configuration is {S2, S4, S5, S1, S6}, and when the function given by equation (3) is executed on these inputs, the resultant operation is given as:

$$+S2+S4+S5-S1-S6 \quad (4)$$

Also, example pseudo code for the above mentioned generic function for the total pair (3, 2) may be provided as follows:

```
Add3SignalsThenSubtract2Signals(SA, SB, SC, SD, SE)
{
    Output(i) = 0;
    For (i = 0; i < 160; i++)
    {
        Output(i) = Output(i) + SA (i) + SB (i) + SC (i) − SD (i) − SE
        (i);
    }
}
```

where SA to SE are the input signal arguments to the function. As seen by this approach, the calculations are performed sample-wise on the input frames to obtain the whole output frame. After reordering of input signal frames based on the mixing configuration, correct inputs are to be assigned to SA through SE for producing the desired mixing output frame.

As mentioned above, however, it could be that {−1, 1, 1, 1, −1, Null} is also available as shown in column 605 of FIG. 6, and forms order {S2, S3, S4, S1, S5}. In this case, the same function is applied, and found at the entry for the same total pair (3, 2) and corresponding OIV on the LUT. The signal or source designations (S1 to S6 for example) which are properly reordered as mentioned before, are then plugged into the generic mixing function as input signal arguments during processing or mixing of the signals. By this approach, it is permissible for an application providing the mixture configurations to have multiple different mixture configurations with the same total pair, but with a different order of coefficients, in a single mixture-matrix.

Process 300 then may include "calculate offset index values (OIVs) . . . " 308 where $$\text{OIV}=N_1*(N_1+1)/2+B \quad (5)$$

and for each mixture configuration, where $N_1$ is the total or count of non-zero coefficients in the mixture configuration, and B is the number of −1 coefficients (or negative coefficients or coefficients to be subtracted). In more detail, while complying with the limitations of A and B in total pair (A, B) from equation (1) above, the number of possible total pairs established from the number of sources N is the number of functions that may be provided in the LUT as well as the number of offset index values to be used to map the total pairs of the functions. Equation (5) provides the numerical value for the OIV.

For instance, using equation (5), and starting with offset OIV=0 ($N_1$=0), for sources N=6, the offset values will run from 0 (for total pair (0, 0)) to 27 (for total pair (0, 6)). The size S (number of total pairs and associated mixing functions in the LUT) of the look up table then, is:

$$S=(N+1)(N+2)/2 \quad (6)$$

where, for the continuing example, S=28 for N=6. It will be understood A positive coefficients could be used in equation (5) instead of B subtractions, or other combinations of A and B may be used in equation (5). It will be appreciated that other equations for the offset index value may be used instead.

Process 300 then may include "setup look up table" 310. For this operation, an ordering is used for the listing of the total pairs, and in turn the functions associated with each total pair, within the LUT. For achieving this, the search (or assignment) space for solutions (or total pairs) should be minimized to the extent possible compared to the above inequality (equation (1)). Hence, the above inequality is reframed as:

$$A+B=C, \text{ where } 0 \le A \le C, 0 \le B \le C, 0 \le C \le N \quad (7)$$

where the total pair is still (A, B) and N is still defined as the number of sources from above. Thus, to place solution pairs (A, B) in a desired order, the values of C, which is the same as $N_1$, are increased from 0 through N as the first or primary ordering, and for each value of C, the value of B is increased from 0 through C as the secondary ordering. This ordering corresponds to the numerical ordering of the OIVs. The total pairs which result from this logic are said to be "well ordered". Thus, each total pair represented in the LUT corresponds to a unique mix of additions and subtractions (irrespective of order) of mixing signals. Since a solution or total pair (A, B) translates to a unique mixing function with 'A' number of additions followed by 'B' number of subtractions as explained above. The mixing functions inside the LUT will be enumerated in a proper order as well. Also, the ordering of OIVs in numerical order and as calculated from equation (5) and total pairs according to equation (7) is provided on a sample LUT for N=6 as follows with offset index value (OIV), positive or coefficients to be added A, and negative or coefficients to be subtracted B:

| OIV | A | B |
|---|---|---|
| 0 | 0 | 0 |
| 1 | 1 | 0 |
| 2 | 0 | 1 |
| 3 | 2 | 0 |
| 4 | 1 | 1 |
| 5 | 0 | 2 |
| 6 | 3 | 0 |
| 7 | 2 | 1 |
| 8 | 1 | 2 |
| 9 | 0 | 3 |
| 10 | 4 | 0 |
| 11 | 3 | 1 |
| 12 | 2 | 2 |
| 13 | 1 | 3 |
| 14 | 0 | 4 |
| 15 | 5 | 0 |
| 16 | 4 | 1 |
| 17 | 3 | 2 |
| 18 | 2 | 3 |
| 19 | 1 | 4 |
| 20 | 0 | 5 |
| 21 | 6 | 0 |
| 22 | 5 | 1 |
| 23 | 4 | 2 |
| 24 | 3 | 3 |
| 25 | 2 | 4 |
| 26 | 1 | 5 |
| 27 | 0 | 6 |

Any order of functions inside the LUT is possible based on which formula or mapping between a total pair and a mixing function is defined. If the order of functions inside the LUT is random, a formula cannot be derived between the offset of a mixing function (total pair) and the mixing function (total pair), a table mapping can be maintained between offset and the mixing function (total pair). An example of random reordering is shown below:

| OIV | A | B |
|---|---|---|
| 0 | 1 | 0 |
| 1 | 0 | 0 |
| 2 | 1 | 1 |
| 3 | 2 | 0 |
| 4 | 0 | 1 |
| 5 | 0 | 2 |
| 6 | 5 | 0 |
| 7 | 2 | 1 |
| 8 | 1 | 2 |
| 9 | 0 | 6 |
| 10 | 4 | 0 |
| 11 | 3 | 1 |
| 12 | 2 | 3 |
| 13 | 1 | 3 |
| 14 | 0 | 4 |
| 15 | 3 | 0 |
| 16 | 4 | 1 |
| 17 | 3 | 2 |
| 18 | 2 | 2 |
| 19 | 1 | 4 |
| 20 | 0 | 5 |
| 21 | 6 | 0 |
| 22 | 5 | 1 |
| 23 | 4 | 2 |
| 24 | 3 | 3 |
| 25 | 2 | 4 |
| 26 | 1 | 5 |
| 27 | 0 | 3 |

To form the LUT, at least the OIV and mapping to corresponding functions are placed in the LUT. An example of such a LUT 400 is provided on FIG. 4 listing a space for a mixing function and pointing to the offset index value. By one example, one selected (or found) offset index value listed as "OFFSET" and other offsets listed in relation to the found OFFSET, the start of the LUT, or the end of the LUT is shown.

The LUT is now ready for the running of the acoustic signals and actually applying the acoustic signal mixing algorithm to the incoming signal-matrix.

Figure 5:
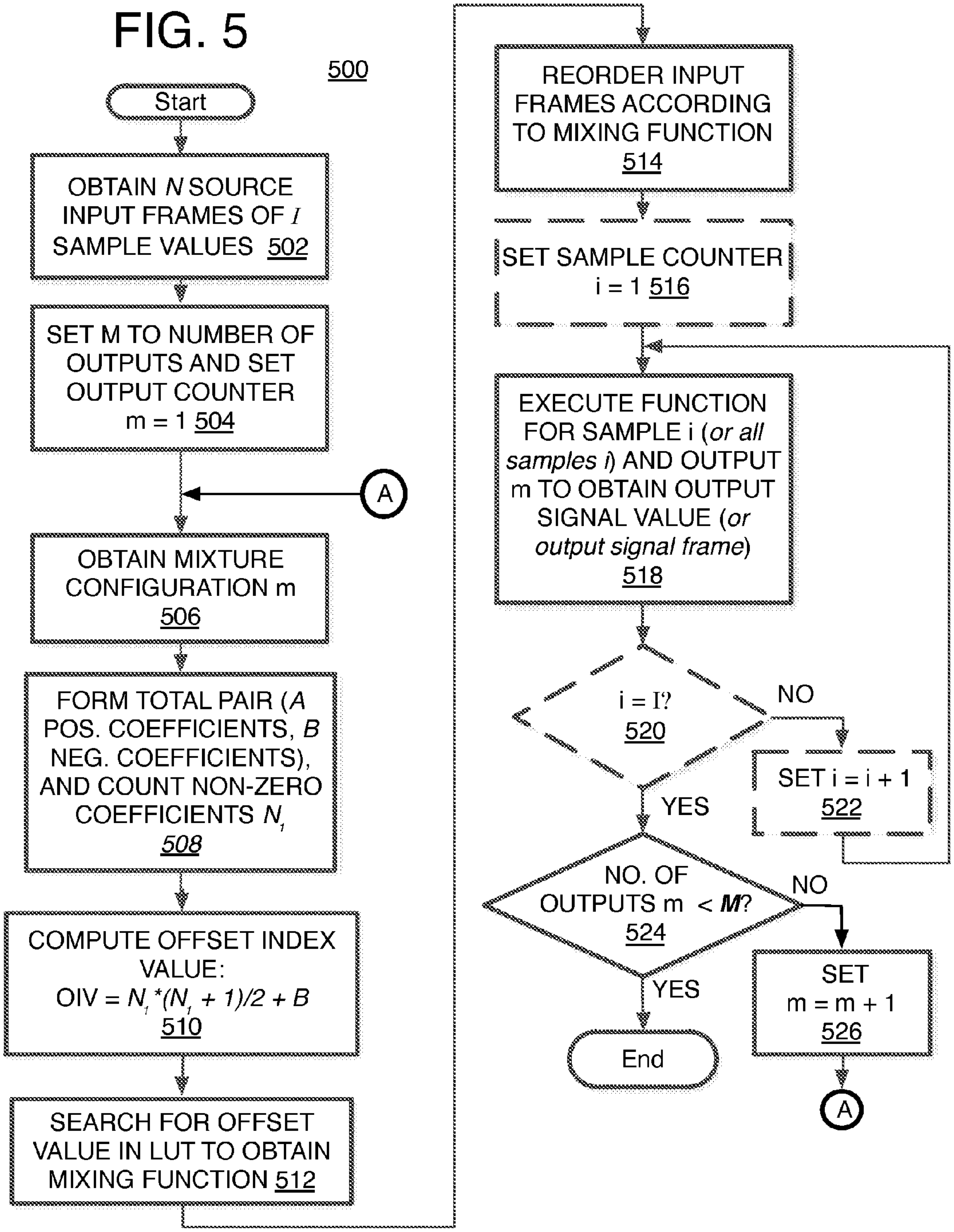
FIG. 5 is another detailed flow chart of an acoustic signal mixing method.

Referring to FIG. 5, an example computer-implemented process 500 for acoustic signal mixing is provided. In the illustrated implementation, process 500 may include one or more operations, functions or actions as illustrated by one or more of operations 502 to 526 numbered evenly. By way of non-limiting example, process 500 may be described herein with reference to example acoustic signal mixing devices described herein and with any of FIGS. 1, 4, 6, and 8, and where relevant.

Process 500 may include "obtain N source input frames of I sample values" 502. This operation refers to obtaining the frames for building the signal-matrix, such as signal-matrix 602 on FIG. 6. The number of columns or frames in the matrix, which is also the number of sources, is N, and the number of rows or samples is I. The frames may be obtained from acoustic capture devices such as multiple microphones, which may or may not be located on a single electronic device. Each acoustic capture device may be considered a source number S1, S2, etc., and shown numbered S1 to S6 from left to right on example signal-matrix 602.

Process 500 may include "set M to number of outputs and set output counter m=1" 504. Here, the mixture-matrix is set up, where each output m also is a column of the mixture-matrix and a mixture configuration of coefficients from the set of {1, 0, −1}, similar to mixture-matrix 604 (FIG. 6). It will be appreciated that this algorithm can also be extended to coefficients other than {−1, 0, +1} by pre-multiplying the signal vectors with the non-zero absolute coefficients (modulus of coefficients), thereby transforming the rest of the problem into a special case acoustic signal mixing method proposed herein.

A single total pair may have a variety of different mixture configurations with different orders of coefficients but with the same number of 1s and −1s where the reordered input as per the mixing configuration are plugged into a generalized mixing function in the LUT as input signal arguments.

Also, output counter m is set to 1 to analyze the first column in the mixture-matrix (the left column 608 (FIG. 6)). This will start the count to run the algorithm output by output where the input signal frames are applied to a mixing column to produce an output frame and then proceeds to the next output frame corresponding to the next mixing column. Thus, process 500 then may include "obtain mixture configuration m" 506, and for the first time this operation is performed, to start the special case acoustic signal mixing method.

Process 500 may comprise "form total pair (A pos. coefficients, B neg. coefficients), and count non-zero coefficients $N_1$" 508. Thus, given a mixture configuration (a column of the mixing matrix), the number of positive elements is computed as A, the number of negative elements is computed as B, and the number of non-zero elements is computed as $N_1$. For the example mixture configuration 608, A=3, B=2 to form a total or solution pair (3, 2), and $N_1$=5.

Process 500 then includes "compute offset index value: OIV=$N_1$*($N_1$+1)/2+B" 510. This equation is the same as equation (5) as recited above for setting up the look up table in the first place. Here, for example mixture configuration 608, OIV=17.

Process 500 then may comprise "search for offset index value in LUT to obtain mixing function" 512, and particularly, the list of offset values is searched in the LUT until the matching number is reached, and the mixing function that is mapped to that OIV number is obtained. Alternatively, the function at OFFSET can be triggered through software function pointer mechanism too.

Process 500 then may include "reorder input frames according to mixing function" 514. Specifically, the mixing function located at the above offset consists of A additions followed by B subtractions. Instead of a single sample, the signals (or frames) from the sources are reordered in the order provided by the mixing function, and are passed as arguments to the mixing function at the computed offset.

For example, N=6 for sources $\{S1, S2, S3, S4, S5, S6\}^T$. Given the mixing configuration as $\{-1, 1, 0, 1, 1, -1\}^T$ for example mixture configuration 608, the desired function (before reordering) may be given as:

$$-S1+S2+S4+S5-S6 \quad (8)$$

as shown on the applied signal frames (sample-wise) (610 on FIG. 6). Reordering the signals or frames, and in turn the sample values, may be performed by applying the function from the LUT at offset (OIV) 17, and the total pair at OIV 17 is (3, 2). The mixing function corresponding to the computed solution pair (3, 2) has 3 additions followed by 2 subtractions. A search may be performed on the mixing column (from top to bottom by one example) to identify the positions of positive elements as well as negative elements. In the example mixing column (mixture configuration), the positions of 1's are at {2, 4, 5} and the positions of −1's are at {1, 6}. By one example approach, firstly, those mixing signals located at the corresponding positions of 1's (from top to bottom) in the mixing column are reordered. Next, those mixing signals located at the corresponding positions of −1's (from top to bottom) in the mixing column sequentially are appended. So reordering the input signals provides $\{S2, S4, S5, S1, S6, NULL\}^T$. These well-ordered inputs when passed to the mixing function located at offset 17 inside the LUT, as computed above, produces output as $$S2+S4+S5-S1-S6 \quad (9)$$

This is the same as the desired mixing function written above (equation (8)) only reordered with the associative property. Thus, in the present example, the reordered mixing function (equation 9) is shown as the sample set 612 (FIG. 6), and the process 500 continues with "execute function for sample i . . . and output m to obtain output signal value . . . " 518.

The mixing function also may provide that first A mixing signals are added, and next B signals are subtracted from the previous sum to form the desired output signal. As mentioned, this provides the advantage of incremental LUT expansion for increasing number of sources of input signals. Thus, executing the function may first add the values S2, S4, S5, and subtract the values S1 and S6. For example set 612, the output signal value is 8 that may be placed in the corresponding location in the output matrix 606.

Each mixing function may start the summation with a zero signal, and then the reordered input signals are added and subtracted based on the total pair. Thus, pseudo code Add3Sub2 signal will start with processing of a zero signal, and then the first 3 reordered signals are added, and next 2 reordered signals are subtracted to get the output signal. By one variation, instead of starting from a zero signal, the mixing function can start with the first non-zero reordered input (sign changed if it corresponds to −1), and thereafter adding or subtracting the other reordered signals. In this case, pseudo code Add3Sub2 function will start with the first non-zero positive signal right away, then add the next 2 reordered signals, and then subtracts the last 2 reordered signals By one example, process 500 includes a sample counter that is set to one (i=1) 516, and to form a loop so that this mixing function is repeated for each sample to produce the output signal. Thus, process 500 includes executing the function (518) as mentioned, and then determining whether i has reached max I (520) such that the output value for every sample in the current frame has been generated. If not, i is set to i+1 (522), and the process loops back to operation 518 to compute the output value for the next sample. It will be appreciated, however, that the execution of the mixing function may be performed in parallel, such as with single-instruction, multiple data (SIMD) processing, such that in this case, the counter may not be needed. In this case, the output values for an entire output frame may be considered to be generated simultaneously.

If the output values for all of the samples to be multiplied by a mixture configuration are generated, the process then continues to provide the output values for the next mixture configuration, and in turn, the next output frame. Process 500 includes "Number of outputs m<M?". If not, the process includes "m=m+1" and the process loops to operation 506 to obtain the next mixture configuration, and provide outputs for the next output frame.

If the last output and last mixture configuration has been used, and the last output frame has been generated (such that m<M is false), the output matrix is complete and the process ends.

With the arrangements described above, for each column of mixture-matrix, an offset inside the LUT is computed, and with well-ordered input signals passed to the correct mixing function at the computed offset inside LUT, the output signal is obtained by iterating the same function sample-wise for the input signals from multiple sources. Hence, signals are mixed (on frame-by-frame basis) from any number of sources into any number of output signals for any mixing matrix based on minimal sized LUT without any tree based decision making or complex branching logic, and avoiding trivial multiplications completely.

In the case of static switch matrices (which typically would be the case in speech/audio applications), one more advantage with the LUT approach over the tree-based approach (running on vector level) is that in the former approach, the computation of indices inside the LUT for each of the outputs is performed prior to mixing and only once whereas in the latter approach, the decision making has to be performed for each and every frame of each and every output signal adding substantial complexity and computation cost avoided by the disclosed process. Instead, with the efficient LUT, once the mixing function to be invoked at a unique offset inside LUT is computed based on the set of mixing coefficients (mixing column), the same mixing function can be executed for each and every sample of the mixing signal frame or vector without any branch divergence logic. With the disclosed algorithm, there may be no restrictions on the permissible mixing combinations.

It is also to be noted that the gain obtained by the proposed LUT based approach will be perceivably extremely large especially in mathematical applications where the sizes of matrices are in the order of 1000's. Especially for SIMD (Single Instruction Multiple Data) architectures, the LUT based approach is well suited to extract very good computational advantages.

It will be appreciated that the signal mixing systems and methods disclosed herein also may be applied to two-dimensional signal processing (image processing) as well as three or other N-dimensional signal processing.

Figure 7:
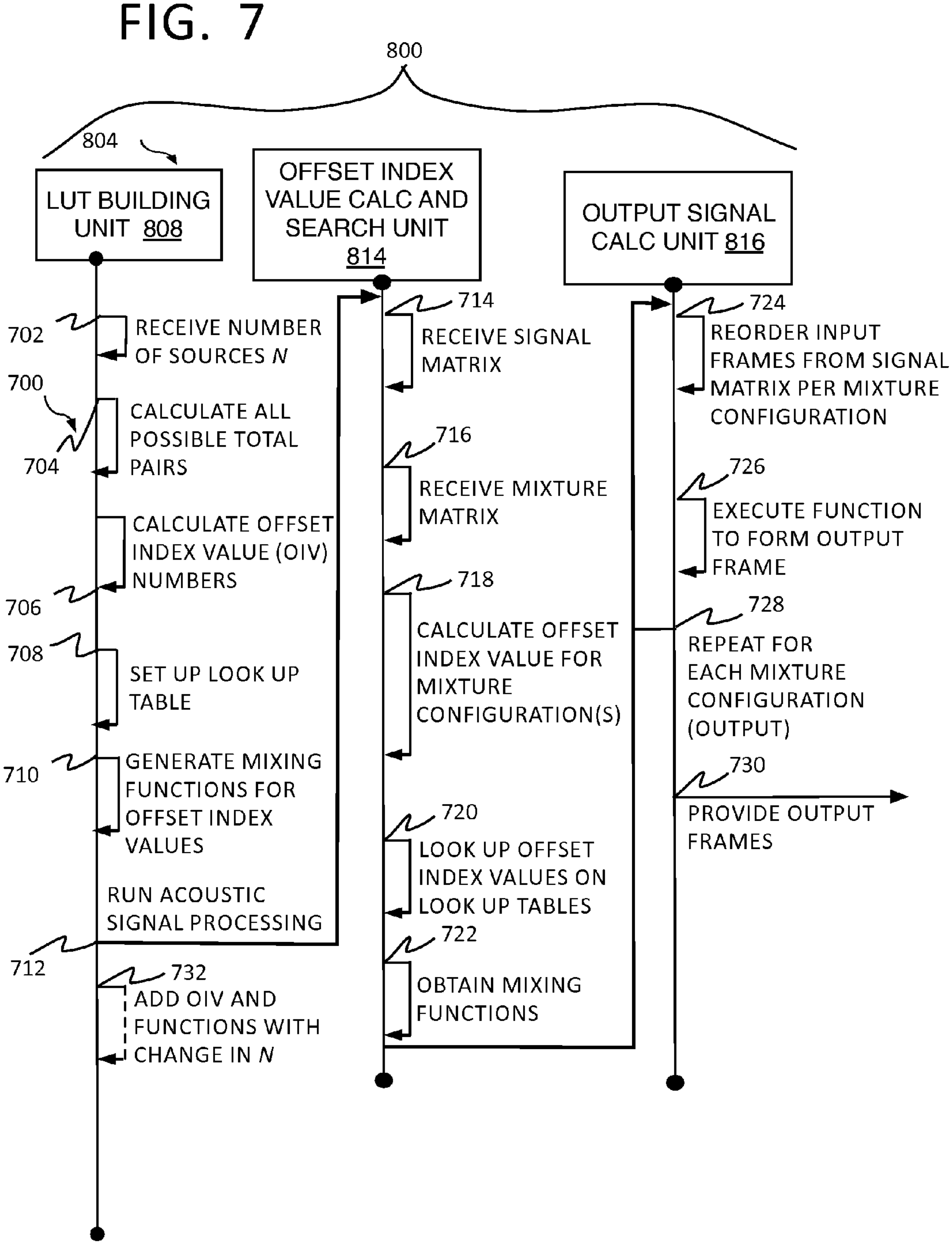
FIG. 7 is a schematic diagram of acoustic signal mixing method in operation.

Referring to FIG. 7, by another approach, process 700 illustrates the operation of a sample acoustic signal processing system 800 that performs acoustic signal mixing using a look up table in accordance with at least some implementations of the present disclosure. In more detail, in the illustrated form, process 700 may include one or more operations, functions or actions as illustrated by one or more of actions 702 to 732 numbered evenly. By way of non-limiting example, process 700 will be described herein with reference to FIG. 8. Specifically, system 800 includes logic units 804 that has an acoustic signal mixing unit 806 with a LUT building unit 808, signal-matrix generator unit 810, mixture-matrix unit 812, offset index value calculation and search unit 814, and an output signal calculation unit 816. The operation of the system may proceed as follows.

The process 700 provides the performance of a matrix multiplication algorithm as described above, where a signal-matrix is multiplied by a mixture-matrix to obtain an output signal-matrix. The signal-matrix may be formed by a signal-matrix generator 810 and by methods described above, while the mixture-matrix may be formed of mixture configurations of coefficients by a mixture-matrix unit 812 and also by methods described above. It will be understood that the mixture-matrix may include one or more matrix configurations.

Thus, process 700 may include "receive number of sources N" 702, and particularly, the number of signals to be mixed on a device or network. The process 700 then may include "calculate all possible total pairs" 704, and as explained above, where the total pair is a count of sample values to be added, and a count of sample values to be subtracted. Thus, for a set of coefficients {1, 0, −1} in a mixture configuration, the total pair is a count A of 1's and B of −1's in the mixture configuration to form a total pair (A, B).

The process 700 then may include "calculate offset index value (OIV) numbers" 706, and specifically where the OIV, by one example, is calculated by $OIV=N_1*(N_1+1)/2+B$ to form a look up table of size S where $S=(N+1)(N+2)/2$ where N is defined above, and $N_1$ is the count of non-zero coefficients in a mixture configuration. Once it is determined all of the offset values to be used, the process 700 may include "set up look up table" 708, which involves setting up a table with S locations for 0 to S−1 offset values, where each offset value is associated with a total pair and a mixing function to be performed on a sample from the signal-matrix and corresponding mixture configuration.

Hence, the process 700 may include "generate mixing functions for offset index values" 710. This operation includes ordering of mathematic operations for a mixing function associated with each offset index value, and in turn, each total pair. Thus, for total pair (3, 2) referring to 3 1's, and 2 −1's, the function provides the coefficients and signal sample values are to be reordered as {1, 1, 1, −1, −1}.

By other examples, the mixing function is more general for a total pair such as SA+SB+SC−SD−SE for the total pair (3, 2) where the source or signal designations are filled in while the mixture-matrix is being used for reordering input signals.

Once the look up table is established, the process 700 then may include "run acoustic signal processing" 712, such that the signal-matrix to be mixed is received 714, and the mixture configurations in the form of the mixture-matrix is received 716. As mentioned, the mixture-matrix may comprise at least one mixture configuration.

The process 700 then may include "calculate offset index value for mixture configuration(s)" 718. Thus, each output or column in the mixture-matrix has an offset index value that corresponds to a total pair and an associated mixing function. Also, the process 700 may include "look up offset index values on look up table" 720, and as explained above, once the offset is found on the table for a particular total pair, the process 700 may include "obtain mixing functions" 722. This provides which signal sample values are to be added, and which subtracted (and which zeroed) to form an output signal value to be placed in an output frame.

Thus, the process 700 may include "reorder input frames from signal-matrix per mixture configuration" 724, and as already explained in the examples above, when the total pair (3, 2) is selected with six sources, the function S2+S4+S5−S1−S6 is used for the mixture configuration {−1, 1, 0, 1, 1, −1}. The process 700 then may include "execute function to form output frame" 726, and the computations are performed frame-by-frame. Thereafter, the process 700 may include "repeat for each mixture configuration (output)" 728. In other words, when more than one output frame is desired, and in turn more than one mixture configuration is provided, the execution operation is repeated for each mixture configuration, and with the same samples from the signal-matrix to form a number of output frames, Once the computations are complete, the process 700 may include "provide output frames" 730, and particularly to another application that will use the mixed output signals for further processing, whether to an encoder or for immediate audible emission, or stored in a memory.

Otherwise, for updating the look up table, the process 700 may include "add OIV and functions with changes in N" 732. Thus, when more sources (and more signals) are being added to the system, all that is needed is the addition of the new total pairs, and by one form, the corresponding offset index values and the associated mixture functions may be generated automatically.

It will be appreciated that processes 200, 300, 500, and/or 700 may be provided by sample audio processing systems 10 and/or 800 to operate at least some implementations of the present disclosure. This includes operation of an LUT building unit 808, signal-matrix generator unit 810, mixture-matrix unit 812, offset index value calculation and search unit 814, an output signal calculation unit 816, as well as others, in audio processing system 800 (FIG. 8), and similarly for system 10 (FIG. 1).

In addition, any one or more of the operations of FIGS. 2-3, 5, and 7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
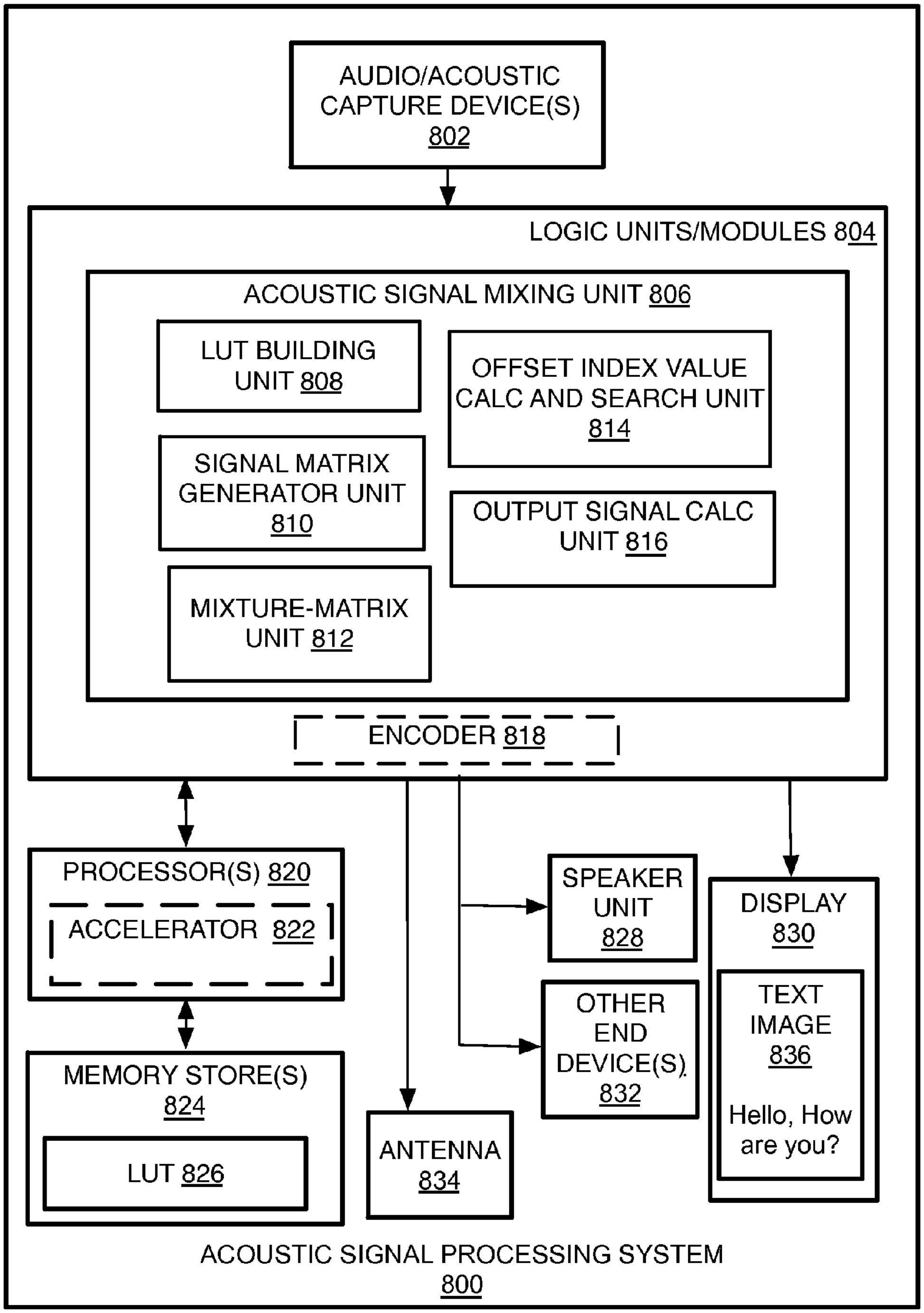
FIG. 8 is an illustrative diagram of an example system.

Referring to FIG. 8, an example acoustic signal processing system 800 is arranged in accordance with at least some implementations of the present disclosure. In various implementations, the example acoustic signal processing system 800 may have an audio/acoustic capture device(s) 802 to form or receive acoustical signal data. This can be implemented in various ways. Thus, in one form, the acoustic signal processing system 800 is a device, or is on a device, with a number of microphones. In other examples, the acoustic signal processing system 800 may be in communication with a network of microphones, and may be remote from these acoustic signal capture devices such that logic modules 804 may communicate remotely with, or otherwise may be communicatively coupled to, the microphones for further processing of the acoustic data.

In either case, such technology may include a telephone, a smart phone, a dictation machine, other sound recording machine, a mobile device or an on-board device, or any combination of these. Thus, in one form, audio capture device 802 may include audio capture hardware including one or more sensors as well as actuator controls. These controls may be part of a sensor module or component for operating the sensor. The sensor component may be part of the audio capture device 802, or may be part of the logical modules 804 or both. Such sensor component can be used to convert sound waves into an electrical acoustic signal. The audio capture device 802 also may have an A/D converter, other filters, and so forth to provide a digital signal for acoustic signal processing.

In the illustrated example, the logic modules 804 may include an acoustic signal mixing unit 806 with a LUT building unit 808, signal-matrix generator unit 810, mixture-matrix unit 812, offset index value calculation and search unit 814, and an output signal calculation unit 816. The logic modules 804 also may include an encoder 818. These units may be used to perform the operations described above where relevant.

The acoustic signal processing system 800 may have one or more processors 820 which may include a dedicated accelerator 822 such as the Intel Atom, memory stores 824 which may or may not hold an LUT 826 similar to the LUT 26 or 400, or memory 30, and so forth mentioned herein, at least one speaker unit 828 to emit audio based on the input acoustic signals, one or more displays 830 to provide images 836 of text, for example, as a visual response to the acoustic signals, other end device(s) 832 to perform actions in response to the acoustic signal, and antenna 834. In one example implementation, the image processing system 800 may have the display 830, at least one processor 820 communicatively coupled to the display, at least one memory 824 communicatively coupled to the processor and having the LUT 826. The antenna 834 may be provided to transmit the output signals or other relevant commands to other devices that may use the output signals. Otherwise, the results of the output signals may be stored in memory 824. As illustrated, any of these components may be capable of communication with one another and/or communication with portions of logic modules 804 and/or audio capture device 802. Thus, processors 820 may be communicatively coupled to the audio capture device 802, the logic modules 804, and the memory 824 for operating those components.

Although acoustic signal processing system 800, as shown in FIG. 8, may include one particular set of blocks or actions associated with particular components or modules, these blocks or actions may be associated with different components or modules than the particular component or module illustrated here.

Figure 9:
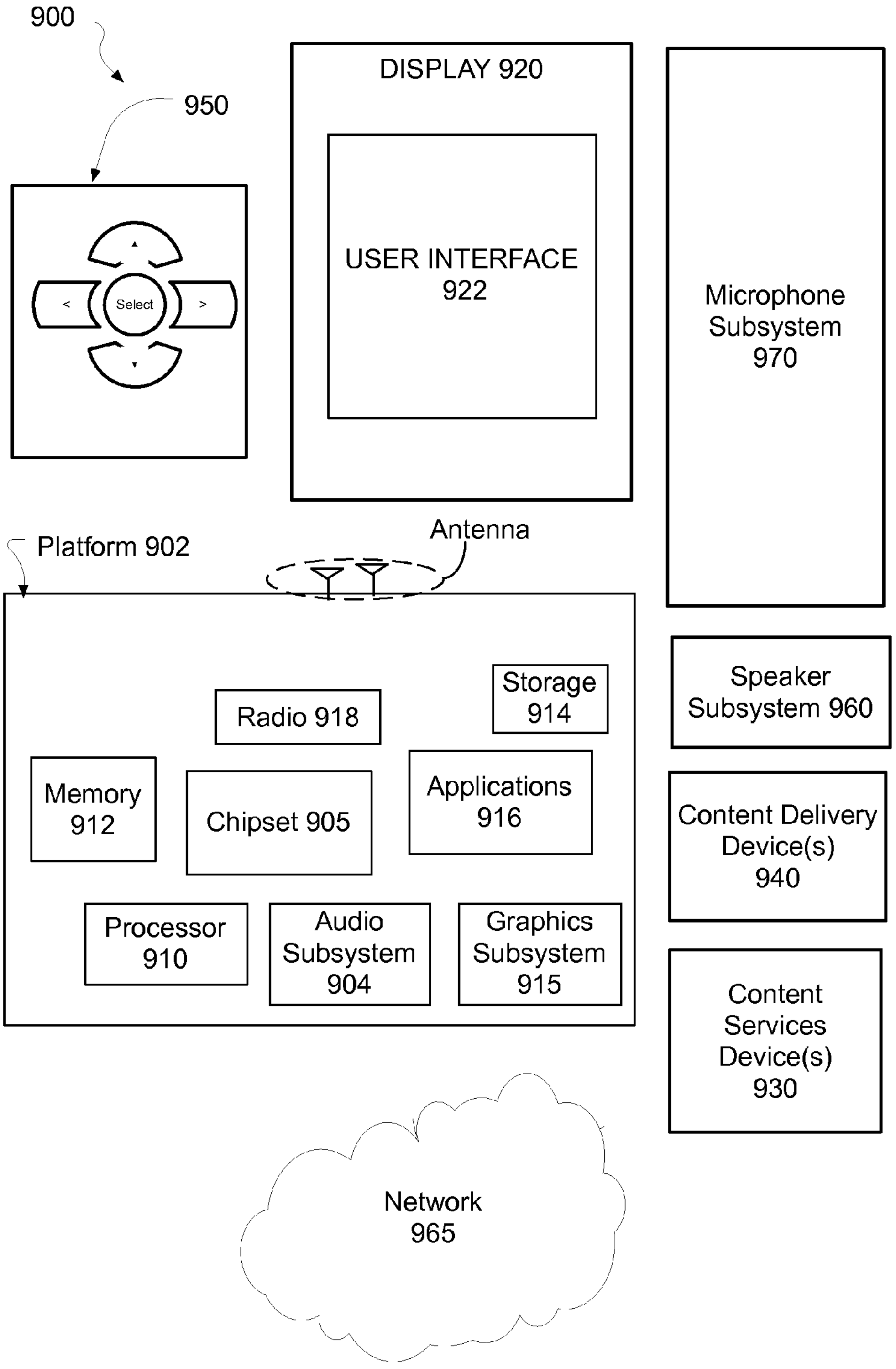
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system described above. In various implementations, system 900 may be a media system although system 900 is not limited to this context. For example, system 900 may be incorporated into one or more microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having a network of acoustic signal producing devices.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902, speaker subsystem 960, microphone subsystem 970, and/or display 920. Each of these components is described in greater detail below.

In various implementations, platform 902 may include any combination of a chipset 905, processor 910, memory 912, storage 914, audio subsystem 904, graphics subsystem 915, applications 916 and/or radio 918. Chipset 905 may provide intercommunication among processor 910, memory 912, storage 914, audio subsystem 904, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Audio subsystem 904 may perform processing of audio such as acoustic signals for speech recognition as described herein and/or voice recognition. The audio subsystem 904 may comprise one or more processing units, memories, and accelerators. Such an audio subsystem may be integrated into processor 910 or chipset 905. In some implementations, the audio subsystem 904 may be a stand-alone card communicatively coupled to chipset 905. An interface may be used to communicatively couple the audio subsystem 904 to a speaker subsystem 960, microphone subsystem 970, and/or display 920.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920, speaker subsystem 960, and microphone subsystem 970. Platform 902 and/or content services device(s) 930 may be coupled to a network 965 to communicate (e.g., send and/or receive) media information to and from network 965. Content delivery device(s) 940 also may be coupled to platform 902, speaker subsystem 960, microphone subsystem 970, and/or to display 920.

In various implementations, content services device(s) 930 may include a network of microphones, a cable television box, personal computer, network, telephone, Internet enabled devices or appliance capable of delivering digital information and/or content, and any other similar device capable of unidirectionally or bidirectionally communicating content between content providers and platform 902 and speaker subsystem 960, microphone subsystem 970, and/or display 920, via network 965 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 904 also may be used to control the motion of articles or selection of commands on the interface 922.

Movements of the navigation features of controller 950 may be replicated on a display (e.g., display 920) by movements of a pointer, cursor, focus ring, or other visual indicators displayed on the display or by audio commands. For example, under the control of software applications 916, the navigation features located on navigation controller 950 may be mapped to virtual navigation features displayed on user interface 922, for example. In embodiments, controller 950 may not be a separate component but may be integrated into platform 902, speaker subsystem 960, microphone subsystem 970, and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example, or by auditory command. Program logic may allow platform 902 to stream content to media adaptors or other content services device(s) 930 or content delivery device(s) 940 even when the platform is turned "off" In addition, chipset 905 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902, speaker subsystem 960, microphone subsystem 970, and/or display 920 may be an integrated unit. Display 920, speaker subsystem 960, and/or microphone subsystem 970 and content service device(s) 930 may be integrated, or display 920, speaker subsystem 960, and/or microphone subsystem 970 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
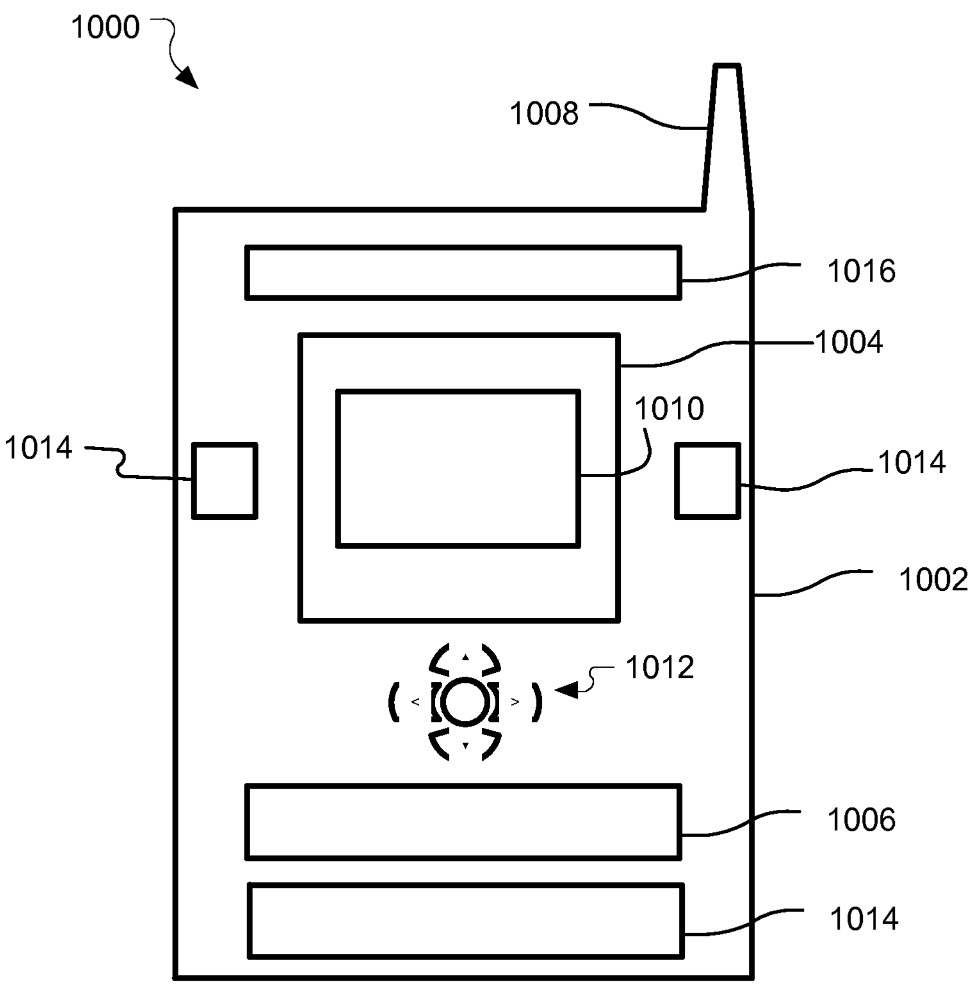
FIG. 10 illustrates another example device, all arranged in accordance with at least some implementations of the present disclosure.

Referring to FIG. 10, a small form factor device 1000 is one example of the varying physical styles or form factors in which system 800 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, software and so forth. Information also may be entered into device 1000 by way of network of two or more microphones 1014. Such information may be processed by an acoustic signal mixing device as described herein as well as a speech and/or voice recognition devices and as part of the device 1000, and may provide audio responses via a speaker 1016 or visual responses via screen 1010. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of acoustic signal mixing comprises receiving multiple acoustic signal frames of samples from multiple sources, and forming at least one mixture configuration having coefficients indicating which one of the coefficients are to be added or subtracted from others of the coefficients. The method also may comprise determining a total pair that is a count of the number of addition coefficients and a count of the number of subtraction coefficients in the mixture configuration, and applying a function to the frames using the total pair to determine, at least in part, at least one output.

By another implementation, the method also may comprise that the multiple sources are all located on the same electronic device, wherein the option exists to provide the mixing configuration with coefficients that indicate an acoustic signal is to be zeroed, wherein applying a function comprises first adding frames to be added to each other, and then subtracting frames to be subtracted according to the total pair and the mixture configuration. The method also may comprise: forming a signal-matrix having each sample forming a row or column, and a frame of each source forming the other of a row or column; multiplying the signal-matrix by a mixture-matrix having each row or column formed by a mixture configuration and other of each row or column corresponding to a frame of a source, and to form an output signal-matrix; using the function associated with the total pair to determine a frame for the output signal-matrix without using multiplication operations; determining an offset index value for a mixture configuration and by using the total pair determined from the mixture configuration; and using the offset index value to look up a mixing function in a look up table to apply to the frames; finding the total pair to match a count of additions and subtractions of a mixture configuration, and on the look up table listing a plurality of total pair functions; finding an offset index value to find a corresponding total pair function in the look up table; reordering the frames by grouping the frames to be added together and grouping the frames to be subtracted together before determining a total to generate the output as an output frame of samples; and adding offset index values and total pairs to the look up table to adjust for a change in the number of sources providing the acoustic signal samples.

Otherwise, the method may include that each offset index value is associated with a function to perform a unique mix of additions and subtractions on a number of the frames; wherein the look up table is ordered first by the sum of the two numbers in the total pair; wherein a secondary order of the look up table is by either the value of the number of the additions or the number of the subtractions in the total pairs; wherein the offset index value is calculated by an equation using the two numbers in the total pair; wherein the offset index value is calculated by: $N_1*((N_1+1)/2)+TPV$, wherein $N_1$ is the total non-zero values in a mixture configuration, and TPV is either a count of B subtraction values or A positive values in the total pair; wherein the only signal data values listed in the look up table are the offset index value, the total pair values, and the functions mapped to the total pairs, and in one example, mapped one-to-one to the total pairs; wherein the total pair is determined from a mixture configuration regardless of the order of the coefficients in the mixture configuration; wherein the coefficients are either from a set having {1, 0, −1} or the set modified by a multiplier before the coefficients are used to generate output signals.

By yet another implementation, a computer-implemented system of acoustic signal mixing comprises at least one acoustic signal receiving unit, at least one processor communicatively connected to the acoustic signal receiving unit, at least one memory communicatively coupled to the at least one processor, and an acoustic signal mixing unit communicatively coupled to the at least one processor and memory. The acoustic signal mixing unit is provided to: receive multiple acoustic signal frames of samples from multiple sources, form at least one mixture configuration having coefficients indicating which one of the coefficients are to be added or subtracted from others of the coefficients, determine a total pair that is a count of the number of addition coefficients and a count of the number of subtraction coefficients in the mixture configuration, and apply a function to the frames using the total pair to determine, at least in part, at least one output.

By another example, the system provides that the multiple sources are all located on the same electronic device, wherein the option exists to provide the mixing configuration with coefficients that indicate an acoustic signal is to be zeroed, wherein applying a function comprises first adding frames to be added to each other, and then subtracting frames to be subtracted according to the total pair and the mixture configuration. Also, the acoustic signal mixing unit may be provided to: form a signal-matrix having each sample forming a row or column, and a frame of each source forming the other of a row or column; multiply the signal-matrix by a mixture-matrix having each row or column formed by a mixture configuration and other of each row or column corresponding to a frame of a source, and to form an output signal-matrix; use the function associated with the total pair to determine a frame for the output signal-matrix without using multiplication operations; determine an offset index value for a mixture configuration and by using the total pair determined from the mixture configuration; and use the offset index value to look up a mixing function in a look up table to apply to the frames; find the total pair to match a count of additions and subtractions of a mixture configuration, and on the look up table listing a plurality of total pair functions; find an offset index value to find a corresponding total pair function in the look up table; reorder the frames by grouping the frames to be added together and grouping the frames to be subtracted together before determining a total to generate the output as an output frame of samples; and add offset index values and total pairs to the look up table to adjust for a change in the number of sources providing the acoustic signal samples.

Otherwise, the system may provide that each offset index value is associated with a function to perform a unique mix of additions and subtractions on a number of the frames; wherein the look up table is ordered first by the sum of the two numbers in the total pair; wherein a secondary order of the look up table is by either the value of the number of the additions or the number of the subtractions in the total pairs; wherein the offset index value is calculated by an equation using the two numbers in the total pair; wherein the offset index value is calculated by: $N_1*((N_1+1)/2)+TPV$, wherein $N_1$ is the total non-zero values in a mixture configuration, and TPV is either a count of B subtraction values or A positive values in the total pair; wherein the only signal data values listed in the look up table are the offset index value, the total pair values, and the functions mapped to the total pairs, and in one example, mapped one-to-one to the total pairs; wherein the total pair is determined from a mixture configuration regardless of the order of the coefficients in the mixture configuration; wherein the coefficients are either from a set having {1, 0, −1} or the set modified by a multiplier before the coefficients are used to generate output signals.

By one approach, at least one computer readable medium comprises a plurality of instructions that in response to being executed on a computing device, causes the computing device to receive multiple acoustic signal frames of samples from multiple sources, and form at least one mixture configuration having coefficients indicating which one of the coefficients are to be added or subtracted from others of the coefficients. The computing device also may be caused to determine a total pair that is a count of the number of addition coefficients and a count of the number of subtraction coefficients in the mixture configuration, and apply a function to the frames using the total pair to determine, at least in part, at least one output.

By another approach, the instructions cause the computing device provides that the multiple sources are all located on the same electronic device, wherein the option exists to provide the mixing configuration with coefficients that indicate an acoustic signal is to be zeroed, wherein applying a function comprises first adding frames to be added to each other, and then subtracting frames to be subtracted according to the total pair and the mixture configuration. Also, the computing device may be caused to: form a signal-matrix having each sample forming a row or column, and a frame of each source forming the other of a row or column; multiply the signal-matrix by a mixture-matrix having each row or column formed by a mixture configuration and other of each row or column corresponding to a frame of a source, and to form an output signal-matrix; use the function associated with the total pair to determine a frame for the output signal-matrix without using multiplication operations; determine an offset index value for a mixture configuration and by using the total pair determined from the mixture configuration; and use the offset index value to look up a mixing function in a look up table to apply to the frames; find the total pair to match a count of additions and subtractions of a mixture configuration, and on the look up table listing a plurality of total pair functions; find an offset index value to find a corresponding total pair function in the look up table; reorder the frames by grouping the frames to be added together and grouping the frames to be subtracted together before determining a total to generate the output as an output frame of samples; and add offset index values and total pairs to the look up table to adjust for a change in the number of sources providing the acoustic signal samples.

Otherwise, the computing device may provide that each offset index value is associated with a function to perform a unique mix of additions and subtractions on a number of the frames; wherein the look up table is ordered first by the sum of the two numbers in the total pair; wherein a secondary order of the look up table is by either the value of the number of the additions or the number of the subtractions in the total pairs; wherein the offset index value is calculated by an equation using the two numbers in the total pair; wherein the offset index value is calculated by: $N_1*((N_1+1)/2)+TPV$, wherein $N_1$ is the total non-zero values in a mixture configuration, and TPV is either a count of B subtraction values or A positive values in the total pair; wherein the only signal data values listed in the look up table are the offset index value, the total pair values, and the functions mapped to the total pairs and in one example, mapped one-to-one to the total pairs; wherein the total pair is determined from a mixture configuration regardless of the order of the coefficients in the mixture configuration; wherein the coefficients are either from a set having $\{1, 0, -1\}$ or the set modified by a multiplier before the coefficients are used to generate output signals.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of acoustic signal mixing comprising:

receiving multiple acoustic signal frames of samples from multiple sources;

forming at least one mixture configuration having at least one addition coefficient to be added to other coefficients in the at least one mixture configuration or at least one subtraction coefficient to be subtracted from others of the coefficients in the at least one mixture configuration or both;

determining a total pair that is a count of the number of addition coefficients and a count of the number of subtraction coefficients in the mixture configuration; and applying a function to the frames using the total pair to determine, at least in part, at least one output.

2. The method of claim 1 wherein the option exists to provide the mixing configuration with coefficients that indicate an acoustic signal is to be zeroed.

3. The method of claim 1 wherein applying a function comprises first adding frames to be added to each other, and then subtracting frames to be subtracted according to the total pair and the mixture configuration.

4. The method of claim 3 comprising reordering the frames by grouping the frames to be added together and grouping the frames to be subtracted together before determining a total to generate the output as an output frame.

5. The method of claim 1 comprising finding the total pair to match a count of additions and subtractions of a mixture configuration, and on a look up table listing a plurality of total pair functions.

6. The method of claim 5 comprising finding an offset index value to find a corresponding total pair function in the look up table, wherein each offset index value is associated with a unique total pair.

7. The method of claim 6 wherein each offset index value is associated with a function to perform a unique mix of additions and subtractions on a number of the frames.

8. The method of claim 6 wherein the offset index value is calculated by an equation using the two numbers in the total pair.

9. The method of claim 8 wherein the offset index value is calculated by:

$$N_1*((N_1+1)/2)+TPV,$$

wherein $N_1$ is the total non-zero values in a mixture configuration, and TPV is either a count of B subtraction values or A positive values in the total pair.

10. The method of claim 6 wherein the only signal data values listed in the look up table are the offset index value, the total pair values, and the functions mapped to the total pairs.

11. The method of claim 5 wherein the look up table is ordered first by the sum of the two numbers in the total pair.

12. The method of claim 5 wherein a secondary order of the look up table is by either the value of the number of the additions or the number of the subtractions in the total pairs.

13. The method of claim 5 comprising adding offset index values and total pairs to the look up table to adjust for a change in the number of sources providing the acoustic signal samples.

14. The method of claim 1 wherein the total pair is determined from a mixture configuration regardless of the order of the coefficients in the mixture configuration.

15. The method of claim 1 comprising:

forming a signal-matrix having each sample forming a row or column, and a frame of each source forming the other of a row or column;

multiplying the signal-matrix by a mixture-matrix having each row or column formed by a mixture configuration and other of each row or column corresponding to a frame of a source, and to form an output signal-matrix, each mixture configuration being associated with an offset index value and corresponding total pair; and using a function associated with the total pair to determine a frame for the output signal-matrix without using multiplication operations.

16. The method of claim 15 comprising determining an offset index value for a mixture configuration and by using the total pair determined from the mixture configuration; and using the offset index value to look up a mixing function in a look up table to apply to the frames.

17. The method of claim 1 wherein the coefficients are either from a set having {1, 0, −1} or the set modified by a multiplier before the coefficients are used to generate output signals.

18. The method of claim 1 wherein the multiple sources are all located on the same electronic device;
wherein the option exists to provide the mixing configuration with coefficients that indicate an acoustic signal is to be zeroed;
wherein applying a function comprises first adding frames to be added to each other, and then subtracting frames to be subtracted according to the total pair and the mixture configuration;
the method comprising:
forming a signal-matrix having each sample forming a row or column, and a frame of each source forming the other of a row or column;
multiplying the signal-matrix by a mixture-matrix having each row or column formed by a mixture configuration and other of each row or column corresponding to a frame of a source, and to form an output signal-matrix;
using the function associated with the total pair to determine a frame for the output signal-matrix without using multiplication operations;
determining an offset index value for a mixture configuration and by using the total pair determined from the mixture configuration; and
using the offset index value to look up a mixing function in a look up table to apply to the frames;
finding the total pair to match a count of additions and subtractions of a mixture configuration, and on the look up table listing a plurality of total pair functions;
finding an offset index value to find a corresponding total pair function in the look up table; and
reordering the frames by grouping the frames to be added together and grouping the frames to be subtracted together before determining a total to generate the output as an output frame of samples; and
adding offset index values and total pairs to the look up table to adjust for a change in the number of sources providing the acoustic signal samples;
wherein each offset index value is associated with a function to perform a unique mix of additions and subtractions on a number of the frames;
wherein the look up table is ordered first by the sum of the two numbers in the total pair;
wherein a secondary order of the look up table is by either the value of the number of the additions or the number of the subtractions in the total pairs;
wherein the offset index value is calculated by an equation using the two numbers in the total pair;
wherein the offset index value is calculated by:

$$N_1*((N_1+1)/2)+\text{TPV},$$

wherein $N_1$ is the total non-zero values in a mixture configuration, and TPV is either a count of B subtraction values or A positive values in the total pair;
wherein the only signal data values listed in the look up table are the offset index value, the total pair values, and the functions mapped to the total pairs;
wherein the total pair is determined from a mixture configuration regardless of the order of the coefficients in the mixture configuration;
wherein the coefficients are either from a set having {1, 0, −1} or the set modified by a multiplier before the coefficients are used to generate output signals.

19. A computer-implemented system of acoustic signal mixing, comprising:
at least one acoustic signal receiving unit to receive at least two acoustic signals;
at least one processor communicatively connected to the acoustic signal receiving unit;
at least one memory communicatively coupled to the at least one processor; and
an acoustic signal mixing unit communicatively coupled to the at least one processor and memory, and to:
receive multiple acoustic signal frames of samples from multiple sources;
form at least one mixture configuration having at least one addition coefficient to be added to other coefficients in the at least one mixture configuration or at least one subtraction coefficient to be subtracted from others of the coefficients in the at least one mixture configuration or both;
determine a total pair that is a count of the number of addition coefficients and a count of the number of subtraction coefficients in the mixture configuration; and
apply a function to the frames using the total pair to determine, at least in part, at least one output.

20. The system of claim 19 wherein applying a function comprises first adding frames to be added to each other, and then subtracting frames to be subtracted according to the total pair and the mixture configuration.

21. The system of claim 20 comprising reordering the frames by grouping the frames to be added together and grouping the frames to be subtracted together before determining a total to generate the output as an output frame.

22. The system of claim 19 comprising finding the total pair to match a count of additions and subtractions of a mixture configuration, and on a look up table listing a plurality of total pair functions.

23. The system of claim 19 wherein the multiple sources are all located on the same electronic device;
wherein the option exists to provide the mixing configuration with coefficients that indicate an acoustic signal is to be zeroed;
wherein applying a function comprises first adding frames to be added to each other, and then subtracting frames to be subtracted according to the total pair and the mixture configuration;
wherein the acoustic signal mixing unit to:
form a signal-matrix having each sample forming a row or column, and a frame of each source forming the other of a row or column;
multiply the signal-matrix by a mixture-matrix having each row or column formed by a mixture configuration and other of each row or column corresponding to a frame of a source, and to form an output signal-matrix;
use the function associated with the total pair to determine a frame for the output signal-matrix without using multiplication operations;
determine an offset index value for a mixture configuration and by using the total pair determined from the mixture configuration; and
use the offset index value to look up a mixing function in a look up table to apply to the frames;

find the total pair to match a count of additions and subtractions of a mixture configuration, and on the look up table listing a plurality of total pair functions;

find an offset index value to find a corresponding total pair function in the look up table; and reorder the frames by grouping the frames to be added together and grouping the frames to be subtracted together before determining a total to generate the output as an output frame of samples; and add offset index values and total pairs to the look up table to adjust for a change in the number of sources providing the acoustic signal samples;

wherein each offset index value is associated with a function to perform a unique mix of additions and subtractions on a number of the frames;

wherein the look up table is ordered first by the sum of the two numbers in the total pair;

wherein a secondary order of the look up table is by either the value of the number of the additions or the number of the subtractions in the total pairs;

wherein the offset index value is calculated by an equation using the two numbers in the total pair;

wherein the offset index value is calculated by:

$$N_1*((N_1+1)/2)+\text{TPV},$$

wherein $N_1$ is the total non-zero values in a mixture configuration, and TPV is either a count of B subtraction values or A positive values in the total pair;

wherein the only signal data values listed in the look up table are the offset index value, the total pair values, and the functions mapped to the total pairs;

wherein the total pair is determined from a mixture configuration regardless of the order of the coefficients in the mixture configuration; and wherein the coefficients are either from a set having {1, 0, −1} or the set modified by a multiplier before the coefficients are used to generate output signals.

24. A non-transitory computer readable medium comprising a plurality of instructions that in response to being executed on a computing device, causes the computing device to:

receive multiple acoustic signal frames of samples from multiple sources;

form at least one mixture configuration having at least one addition coefficient to be added to other coefficients in the at least one mixture configuration or at least one subtraction coefficient to be subtracted from others of the coefficients in the at least one mixture configuration or both;

determine a total pair that is a count of the number of addition coefficients and a count of the number of subtraction coefficients in the mixture configuration; and apply a function to the frames using the total pair to determine, at least in part, at least one output.

25. The medium of claim 24, wherein the multiple sources are all located on the same electronic device;

wherein the option exists to provide the mixing configuration with coefficients that indicate an acoustic signal is to be zeroed;

wherein applying a function comprises first adding frames to be added to each other, and then subtracting frames to be subtracted according to the total pair and the mixture configuration;

wherein the instructions cause the computing device to:

form a signal-matrix having each sample forming a row or column, and a frame of each source forming the other of a row or column;

multiply the signal-matrix by a mixture-matrix having each row or column formed by a mixture configuration and other of each row or column corresponding to a frame of a source, and to form an output signal-matrix;

use the function associated with the total pair to determine a frame for the output signal-matrix without using multiplication operations;

determine an offset index value for a mixture configuration and by using the total pair determined from the mixture configuration; and use the offset index value to look up a mixing function in a look up table to apply to the frames;

find the total pair to match a count of additions and subtractions of a mixture configuration, and on the look up table listing a plurality of total pair functions;

find an offset index value to find a corresponding total pair function in the look up table; and reorder the frames by grouping the frames to be added together and grouping the frames to be subtracted together before determining a total to generate the output as an output frame of samples; and add offset index values and total pairs to the look up table to adjust for a change in the number of sources providing the acoustic signal samples;

wherein each offset index value is associated with a function to perform a unique mix of additions and subtractions on a number of the frames;

wherein the look up table is ordered first by the sum of the two numbers in the total pair;

wherein a secondary order of the look up table is by either the value of the number of the additions or the number of the subtractions in the total pairs;

wherein the offset index value is calculated by an equation using the two numbers in the total pair;

wherein the offset index value is calculated by:

$$N_1*((N_1+1)/2)+\text{TPV},$$

wherein $N_1$ is the total non-zero values in a mixture configuration, and TPV is either a count of B subtraction values or A positive values in the total pair;

wherein the only signal data values listed in the look up table are the offset index value, the total pair values, and the functions mapped to the total pairs;

wherein the total pair is determined from a mixture configuration regardless of the order of the coefficients in the mixture configuration; and wherein the coefficients are either from a set having {1, 0, −1} or the set modified by a multiplier before the coefficients are used to generate output signals.

* * * * *